United States Patent
You et al.

(10) Patent No.: US 10,362,596 B2
(45) Date of Patent: Jul. 23, 2019

(54) METHOD AND WIRELESS DEVICE FOR RECEIVING PDSCH

(71) Applicant: LG ELECTRONICS INC., Seoul (KR)

(72) Inventors: Hyangsun You, Seoul (KR); Hanbyul Seo, Seoul (KR); Yunjung Yi, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 15/563,109

(22) PCT Filed: Mar. 3, 2016

(86) PCT No.: PCT/KR2016/002160
§ 371 (c)(1),
(2) Date: Sep. 29, 2017

(87) PCT Pub. No.: WO2016/163645
PCT Pub. Date: Oct. 13, 2016

(65) Prior Publication Data
US 2018/0084572 A1    Mar. 22, 2018

Related U.S. Application Data

(60) Provisional application No. 62/145,528, filed on Apr. 10, 2015.

(51) Int. Cl.
*H04L 5/14* (2006.01)
*H04W 72/04* (2009.01)
(Continued)

(52) U.S. Cl.
CPC ............ *H04W 72/1289* (2013.01); *H04L 5/14* (2013.01); *H04W 72/042* (2013.01); *H04W 72/0446* (2013.01); *H04L 5/0053* (2013.01)

(58) Field of Classification Search
CPC ............ H04W 72/0446; H04W 72/042; H04L 5/0055; H04L 5/14
See application file for complete search history.

(56) References Cited

U.S. PATENT DOCUMENTS 9,642,124 B2 * 5/2017 Li .......................... H04L 5/0055
2013/0329661 A1 12/2013 Chen et al.
(Continued)

FOREIGN PATENT DOCUMENTS

WO   WO 2014/021632 A1   6/2014
WO   WO 2015/046830      4/2015

OTHER PUBLICATIONS

3GPP TS 36.211 V10.4.0 (Dec. 2011), Techinical Specification, 3rd Generation Parnership Project; Technical Specification Group Radio Access Netwok; Evolved Universal Terrestrial Radio Access (E-UTRA); Physical Channels and Modulation (Release 10).
(Continued)

*Primary Examiner* — Chandrahas B Patel
(74) *Attorney, Agent, or Firm* — Birch, Stewart, Kolasch & Birch, LLP

(57) ABSTRACT

The present disclosure provides a method for receiving a physical downlink shared channel (PDSCH), the method being performed by a wireless device. The method may comprise the steps of determining the number of physical resource blocks (PRBs); and determining a transport block size (TBS) within the PDSCH on the basis of the determined number of the PRBs, wherein when the wireless device is an LC device or when the wireless device is set to CE so that the PDSCH is repeatedly received on a plurality of subframes, the number of PRBs used for determining the TBS can be calculated to be the same as the total number of PRBs
(Continued)

that have been actually allocated for the PDSCH, regardless of whether the PDSCH is received in a TDD special subframe.

15 Claims, 23 Drawing Sheets

(51) Int. Cl.
*H04W 72/12* (2009.01)
*H04L 5/00* (2006.01)

(56) References Cited

U.S. PATENT DOCUMENTS

2015/0085794 A1    3/2015   Chen et al.
2015/0195069 A1    7/2015   Yi et al.

OTHER PUBLICATIONS

3GPP TS 36.213 V12.5.0 (Mar. 2015), Techinical Specification, 3rd Generation Parnership Project; Technical Specification Group Radio Access Netwok; Evolved Universal Terrestrial Radio Access (E-UTRA); Physical layer procedures (Release 12).

\* cited by examiner

METHOD AND WIRELESS DEVICE FOR RECEIVING PDSCH

CROSS REFERENCE TO RELATED APPLICATIONS

This application is the National Phase of PCT International Application No. PCT/KR2016/002160, filed on Mar. 3, 2016, which claims priority under 35 U.S.C. 119(e) to U.S. Provisional Application No. 62/145,528, filed on Apr. 10, 2015, all of which are hereby expressly incorporated by reference into the present application.

BACKGROUND OF THE INVENTION

Field of the Invention

The present invention relates to mobile communication.

Related Art

3rd generation partnership project (3GPP) long term evolution (LTE) evolved from a universal mobile telecommunications system (UMTS) is introduced as the 3GPP release 8. The 3GPP LTE uses orthogonal frequency division multiple access (OFDMA) in a downlink, and uses single carrier-frequency division multiple access (SC-FDMA) in an uplink. The 3GPP LTE employs multiple input multiple output (MIMO) having up to four antennas. In recent years, there is an ongoing discussion on 3GPP LTE-advanced (LTE-A) evolved from the 3GPP LTE.

As disclosed in 3GPP TS 36.211 V10.4.0 (2011-12) "Evolved Universal Terrestrial Radio Access (E-UTRA); Physical Channels and Modulation (Release 10)", a physical channel of LTE may be classified into a downlink channel, i.e., a PDSCH (Physical Downlink Shared Channel) and a PDCCH (Physical Downlink Control Channel), and an uplink channel, i.e., a PUSCH (Physical Uplink Shared Channel) and a PUCCH (Physical Uplink Control Channel).

Meanwhile, in recent years, research into communication between devices or the device and a server without human interaction, that is, without human intervention, that is, machine-type communication (MTC) has been actively conducted. The MTC represents a concept in which not a terminal used by human but a machine performs communication by using the existing wireless communication network.

Since MTC has features different from communication of a normal UE, a service optimized to MTC may differ from a service optimized to human-to-human communication. In comparison with a current mobile network communication service, MTC can be characterized as a different market scenario, data communication, less costs and efforts, a potentially great number of MTC devices, wide service areas, low traffic for each MTC device, etc.

Meanwhile, recently, extension or enhancement of cell coverage of a base station (BS) for MTC devices has been considered. However, when an MTC device is placed in a coverage extension (CE) or a coverage enhancement (CE) area, a downlink channel may not be properly received. To this end, the BS may consider to repeatedly transmit the same downlink channels on a plurality of subframes.

However, when one of the subframes in which the downlink channel is transmitted is a special subframe based on TDD or a subframe in which a synchronization signal is transmitted, available resources for transmitting the downlink channel in a corresponding subframe are reduced. In this case, the MTC device cannot expect the same downlink channel as in the previous subframe to be received in the current subframe.

SUMMARY OF THE INVENTION

Accordingly, a disclosure of the present specification has been made in an effort to solve the aforementioned problem.

To achieve the foregoing purposes, the disclosure of the present invention proposes a method for receiving a physical downlink shared channel (PDSCH). The method may comprise: calculating a number of physical resource blocks (PRBs); and determining a transport block size in the PDSCH based on the calculated number of PRBs. If the wireless device does not correspond to a low-cost/low-capability (LC) device and if the wireless device is not configured for a coverage enhancement (CE) and if the PDSCH is to be received on a TDD-based special subframe, the number of PRBs used to determine the transport block size is calculated to be smaller than an actual total number of PRBs allocated for the PDSCH. If the wireless device corresponds to the LC device or if the wireless device is configured for the CE such that the PDSCH is repeatedly received among a plurality of subframes, the number of PRBs used to determine the transport block size is calculated to be the same as an actual total number of PRBs allocated for the PDSCH, regardless of whether the PDSCH is to be received on a TDD-based special subframe.

If the wireless device does not correspond to a LC device and if the wireless device is not configured for the CE, a transport block size on a TDD-based downlink subframe is determined to be different from a transport block size on a TDD-based special subframe, regardless of whether an actual total number of PRBs on the TDD-based downlink subframe is the same as an actual total number of PRBs on the TDD-based special subframe.

If the wireless device corresponds to the LC device or if the wireless device is configured for the CE such that the PDSCH is repeatedly received among a plurality of subframes, the transport block size is determined based on the number of PRBs which is equal to the actual total number of PRBs, without discriminating the TDD-based downlink subframe and the TDD-based special subframe.

The method may further comprise: determining the actual total number of the PRBs allocated for the PDSCH.

The method may further comprise: repeatedly receiving, on a plurality of subframes, downlink control channel including downlink control information (DCI) about a scheduling of the PDSCH.

The method may further comprises, when a resource element RE used for receiving the downlink control channel overlaps with an RE resource used for receiving a primary synchronization signal (PSS), a secondary synchronization signal (SSS), or a physical broadcast channel (PBSH), assuming that the downlink control channel is punctured on the RE resource or is rate-matched except for the RE resource.

When a PRB (physical resource block) to be monitored for receiving the downlink control channel overlaps with a PRB used for receiving a PSS, an SSS, or a PBCH, the PRB is not subjected to the monitoring.

To achieve the foregoing purposes, the disclosure of the present invention proposes a method for receiving a physical downlink shared channel (PDSCH). The method may comprise: determining an actual total number of physical resource blocks (PRBs) allocated for the PDSCH; and determining a transport block size in the PDSCH. If the wireless device does not correspond to a low-cost/low-capability (LC) device and if the wireless device is not configured for a coverage enhancement (CE), a transport block size on a TDD-based downlink subframe is determined to be different from a transport block size on a TDD-based special subframe, regardless of whether an actual total number of PRBs on the TDD-based downlink subframe is the same as an actual total number of PRBs on the TDD-based special subframe. If the wireless device corresponds to the LC device or if the wireless device is configured for the CE such that the PDSCH is repeatedly received among a plurality of subframes, the transport block size is determined based on the actual total number of PRBs, without discriminating the TDD-based downlink subframe and the TDD-based special subframe.

To achieve the foregoing purposes, the disclosure of the present invention proposes a wireless device for receiving a physical downlink shared channel (PDSCH). The wireless device may comprise: a transceiver; and a processor configured to control the transceiver and perform steps of: calculating a number of physical resource blocks (PRBs); and determining a transport block size in the PDSCH based on the calculated number of PRBs. If the wireless device does not correspond to a low-cost/low-capability (LC) device and if the wireless device is not configured for a coverage enhancement (CE) and if the PDSCH is to be received on a TDD-based special subframe, the number of PRBs used to determine the transport block size is calculated to be smaller than an actual total number of PRBs allocated for the PDSCH. If the wireless device corresponds to the LC device or if the wireless device is configured for the CE such that the PDSCH is repeatedly received among a plurality of subframes, the number of PRBs used to determine the transport block size is calculated to be the same as an actual total number of PRBs allocated for the PDSCH, regardless of whether the PDSCH is to be received on a TDD-based special subframe.

According to the disclosure of the present specification, the problems of the above-described prior art are solved.

DETAILED DESCRIPTIONS

Figure 1:
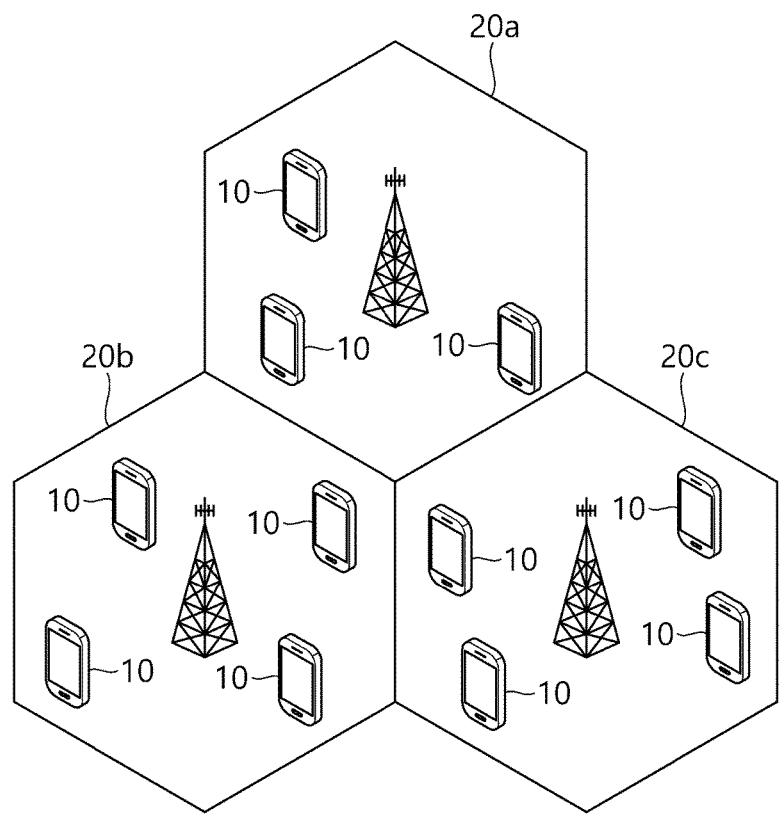
FIG. 1 is a wireless communication system.

Hereinafter, based on 3rd Generation Partnership Project (3GPP) long term evolution (LTE) or 3GPP LTE-advanced (LTE-A), the present invention will be applied. This is just an example, and the present invention may be applied to various wireless communication systems. Hereinafter, LTE includes LTE and/or LTE-A.

The technical terms used herein are used to merely describe specific embodiments and should not be construed as limiting the present invention. Further, the technical terms used herein should be, unless defined otherwise, interpreted as having meanings generally understood by those skilled in the art but not too broadly or too narrowly. Further, the technical terms used herein, which are determined not to exactly represent the spirit of the invention, should be replaced by or understood by such technical terms as being able to be exactly understood by those skilled in the art. Further, the general terms used herein should be interpreted in the context as defined in the dictionary, but not in an excessively narrowed manner.

The expression of the singular number in the present invention includes the meaning of the plural number unless the meaning of the singular number is definitely different from that of the plural number in the context. In the following description, the term 'include' or 'have' may represent the existence of a feature, a number, a step, an operation, a component, a part or the combination thereof described in the present invention, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the present invention.

It will be understood that when an element or layer is referred to as being "connected to" or "coupled to" another element or layer, it can be directly connected or coupled to the other element or layer or intervening elements or layers may be present. In contrast, when an element is referred to as being "directly connected to" or "directly coupled to" another element or layer, there are no intervening elements or layers present.

Hereinafter, exemplary embodiments of the present invention will be described in greater detail with reference to the accompanying drawings. In describing the present invention, for ease of understanding, the same reference numerals are used to denote the same components throughout the drawings, and repetitive description on the same components will be omitted. Detailed description on well-known arts which are determined to make the gist of the invention unclear will be omitted. The accompanying drawings are provided to merely make the spirit of the invention readily understood, but not should be intended to be limiting of the invention. It should be understood that the spirit of the invention may be expanded to its modifications, replacements or equivalents in addition to what is shown in the drawings.

As used herein, 'base station' generally refers to a fixed station that communicates with a wireless device and may be denoted by other terms such as eNB (evolved-NodeB), BTS (base transceiver system), or access point.

As used herein, 'user equipment (UE)' may be stationary or mobile, and may be denoted by other terms such as device, wireless device, terminal, MS (mobile station), UT (user terminal), SS (subscriber station), MT (mobile terminal) and etc.

FIG. 1 illustrates a wireless communication system.

As seen with reference to FIG. 1, the wireless communication system includes at least one base station (BS) 20. Each base station 20 provides a communication service to specific geographical areas (generally, referred to as cells) 20a, 20b, and 20c. The cell can be further divided into a plurality of areas (sectors).

The UE generally belongs to one cell and the cell to which the UE belong is referred to as a serving cell. A base station that provides the communication service to the serving cell is referred to as a serving BS. Since the wireless communication system is a cellular system, another cell that neighbors to the serving cell is present. Another cell which neighbors to the serving cell is referred to a neighbor cell. A base station that provides the communication service to the neighbor cell is referred to as a neighbor BS. The serving cell and the neighbor cell are relatively decided based on the UE.

Hereinafter, a downlink means communication from the base station 20 to the UE1 10 and an uplink means communication from the UE 10 to the base station 20. In the downlink, a transmitter may be a part of the base station 20 and a receiver may be a part of the UE 10. In the uplink, the transmitter may be a part of the UE 10 and the receiver may be a part of the base station 20.

Meanwhile, the wireless communication system may be generally divided into a frequency division duplex (FDD) type and a time division duplex (TDD) type. According to the FDD type, uplink transmission and downlink transmission are achieved while occupying different frequency bands. According to the TDD type, the uplink transmission and the downlink transmission are achieved at different time while occupying the same frequency band. A channel response of the TDD type is substantially reciprocal. This means that a downlink channel response and an uplink channel response are approximately the same as each other in a given frequency area. Accordingly, in the TDD based wireless communication system, the downlink channel response may be acquired from the uplink channel response. In the TDD type, since an entire frequency band is time-divided in the uplink transmission and the downlink transmission, the downlink transmission by the base station and the uplink transmission by the terminal may not be performed simultaneously. In the TDD system in which the uplink transmission and the downlink transmission are divided by the unit of a subframe, the uplink transmission and the downlink transmission are performed in different subframes.

Hereinafter, the LTE system will be described in detail.

Figure 2:
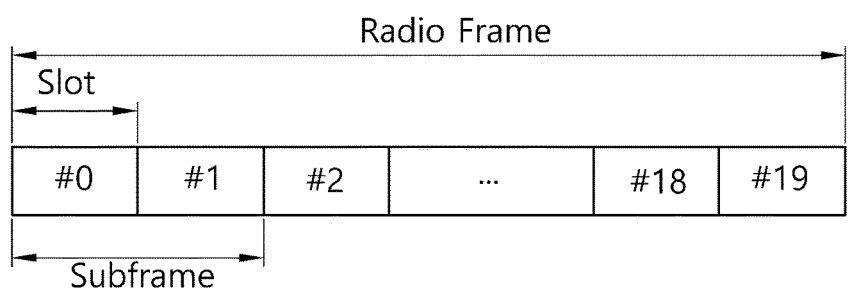
FIG. 2 illustrates a structure of a radio frame according to FDD in 3GPP LTE.

FIG. 2 shows a downlink radio frame structure according to FDD of 3rd generation partnership project (3GPP) long term evolution (LTE).

The radio frame of FIG. 2 may be found in the section 5 of 3GPP TS 36.211 V10.4.0 (2011-12) "Evolved Universal Terrestrial Radio Access (E-UTRA); Physical Channels and Modulation (Release 10)".

The radio frame includes 10 sub-frames indexed 0 to 9. One sub-frame includes two consecutive slots. Accordingly, the radio frame includes 20 slots. The time taken for one sub-frame to be transmitted is denoted TTI (transmission time interval). For example, the length of one sub-frame may be 1 ms, and the length of one slot may be 0.5 ms.

The structure of the radio frame is for exemplary purposes only, and thus the number of sub-frames included in the radio frame or the number of slots included in the sub-frame may change variously.

Meanwhile, one slot may include a plurality of OFDM symbols. The number of OFDM symbols included in one slot may vary depending on a cyclic prefix (CP).

Figure 3:
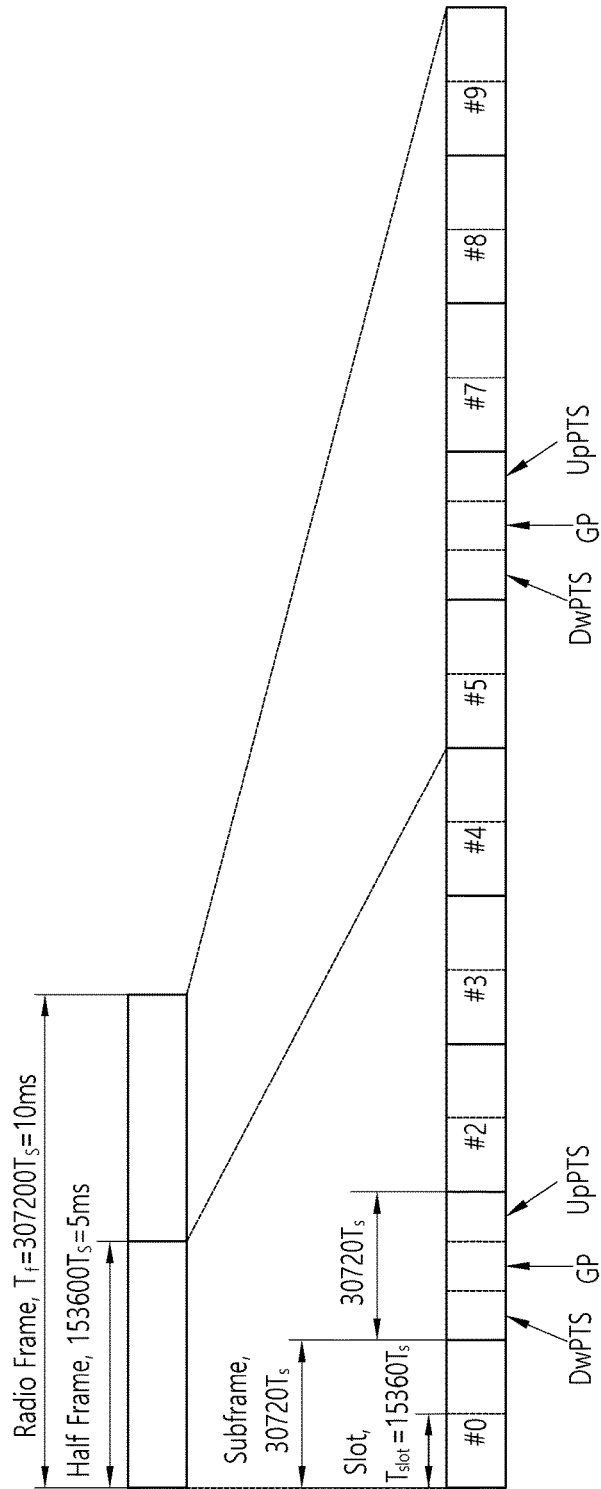
FIG. 3 illustrates a structure of a downlink radio frame according to TDD in the 3GPP LTE.

FIG. 3 illustrates the architecture of a downlink radio frame according to TDD in 3GPP LTE.

For this, 3GPP TS 36.211 V10.4.0 (2011-23) "Evolved Universal Terrestrial Radio Access (E-UTRA); Physical Channels and Modulation (Release 8)", Ch. 4 may be referenced, and this is for TDD (time division duplex).

Sub-frames having index #1 and index #6 are denoted special sub-frames, and include a DwPTS (Downlink Pilot Time Slot: DwPTS), a GP (Guard Period) and an UpPTS (Uplink Pilot Time Slot). The DwPTS is used for initial cell search, synchronization, or channel estimation in a terminal. The UpPTS is used for channel estimation in the base station and for establishing uplink transmission sync of the terminal. The GP is a period for removing interference that arises on uplink due to a multi-path delay of a downlink signal between uplink and downlink.

In TDD, a DL (downlink) sub-frame and a UL (Uplink) co-exist in one radio frame. Table 1 shows an example of configuration of a radio frame.

TABLE 1

| UL-DL configuration | Switch-point periodicity | Subframe index | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

'D' denotes a DL sub-frame, 'U' a UL sub-frame, and 'S' a special sub-frame. When receiving a UL-DL configuration from the base station, the terminal may be aware of whether a sub-frame is a DL sub-frame or a UL sub-frame according to the configuration of the radio frame

TABLE 2

| Special subframe configuration | Normal CP in downlink | | | Extended CP in downlink | | |
|---|---|---|---|---|---|---|
| | | UpPTS | | | UpPTS | |
| | DwPTS | Normal CP in uplink | Extended CP in uplink | DwPTS | Normal CP in uplink | Extended CP in uplink |
| 0 | 6592 * Ts | 2192 * Ts | 2560 * Ts | 7680 * Ts | 2192 * Ts | 2560 * Ts |
| 1 | 19760 * Ts | | | 20480 * Ts | | |
| 2 | 21952 * Ts | | | 23040 * Ts | | |
| 3 | 24144 * Ts | | | 25600 * Ts | | |
| 4 | 26336 * Ts | | | 7680 * Ts | 4384 * Ts | 5120 * ts |
| 5 | 6592 * Ts | 4384 * Ts | 5120 * ts | 20480 * Ts | | |
| 6 | 19760 * Ts | | | 23040 * Ts | | |
| 7 | 21952 * Ts | | | — | | |
| 8 | 24144 * Ts | | | — | | |
| 9 | 13168 * Ts | | | | | |

Figure 4:
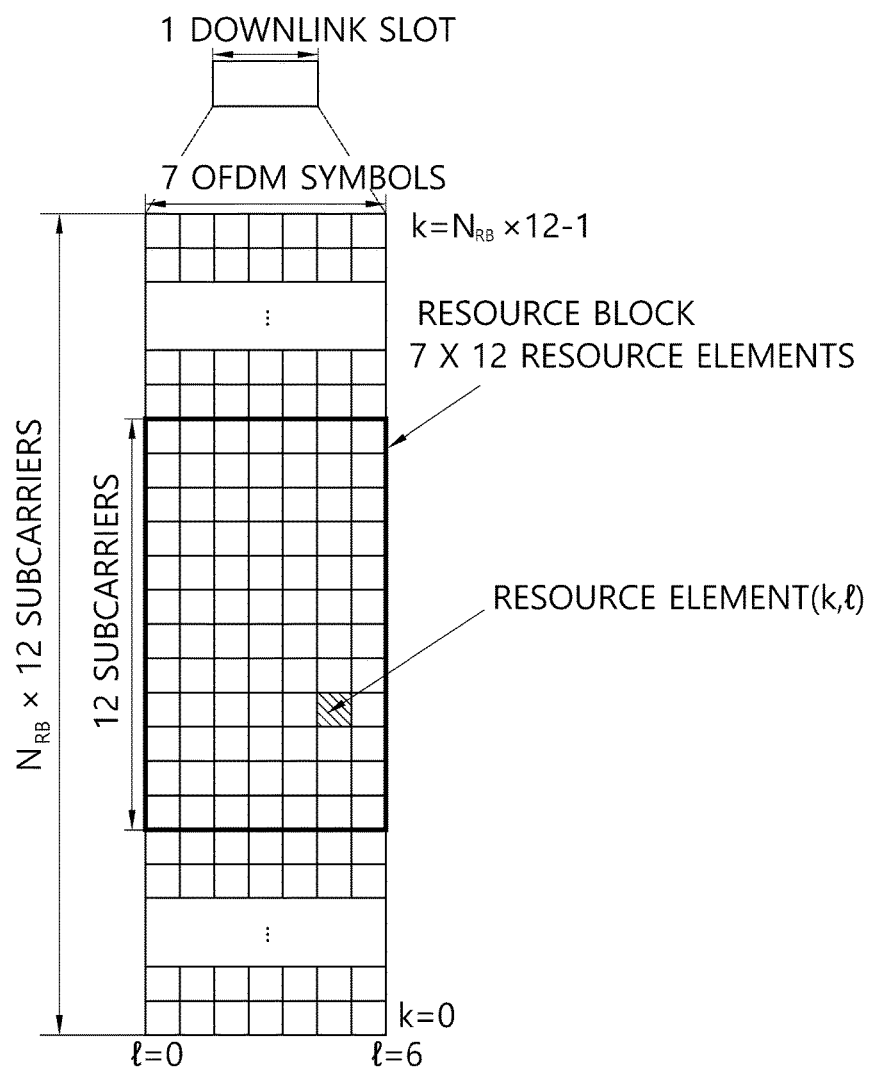
FIG. 4 is an exemplary diagram illustrating a resource grid for one uplink or downlink slot in the 3GPP LTE.

FIG. 4 illustrates an example resource grid for one uplink or downlink slot in 3GPP LTE.

Referring to FIG. 4, the uplink slot includes a plurality of OFDM (orthogonal frequency division multiplexing) symbols in the time domain and NRB resource blocks (RBs) in the frequency domain. For example, in the LTE system, the number of resource blocks (RBs), i.e., NRB, may be one from 6 to 110.

The resource block is a unit of resource allocation and includes a plurality of sub-carriers in the frequency domain. For example, if one slot includes seven OFDM symbols in the time domain and the resource block includes 12 sub-carriers in the frequency domain, one resource block may include 7×12 resource elements (REs).

Meanwhile, the number of sub-carriers in one OFDM symbol may be one of 128, 256, 512, 1024, 1536, and 2048.

In 3GPP LTE, the resource grid for one uplink slot shown in FIG. 4 may also apply to the resource grid for the downlink slot.

Figure 5:
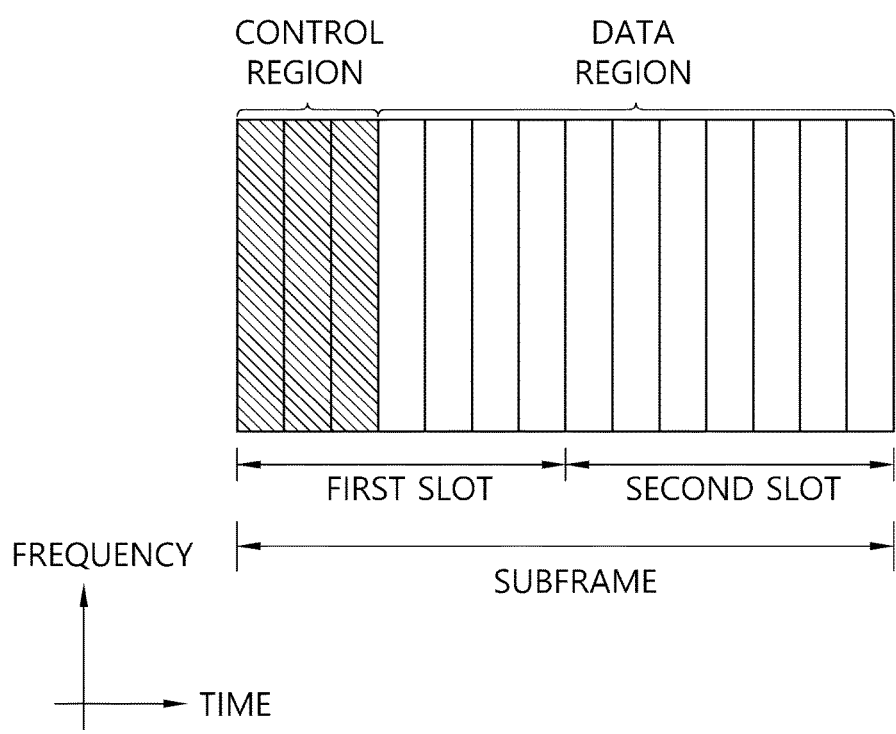
FIG. 5 illustrates a structure of a downlink subframe.

FIG. 5 illustrates the architecture of a downlink sub-frame.

In FIG. 5, assuming the normal CP, one slot includes seven OFDM symbols, by way of example.

The DL (downlink) sub-frame is split into a control region and a data region in the time domain. The control region includes up to first three OFDM symbols in the first slot of the sub-frame. However, the number of OFDM symbols included in the control region may be changed. A PDCCH (physical downlink control channel) and other control channels are assigned to the control region, and a PDSCH is assigned to the data region.

The physical channels in 3GPP LTE may be classified into data channels such as PDSCH (physical downlink shared channel) and PUSCH (physical uplink shared channel) and control channels such as PDCCH (physical downlink control channel), PCFICH (physical control format indicator channel), PHICH (physical hybrid-ARQ indicator channel) and PUCCH (physical uplink control channel).

Figure 6:
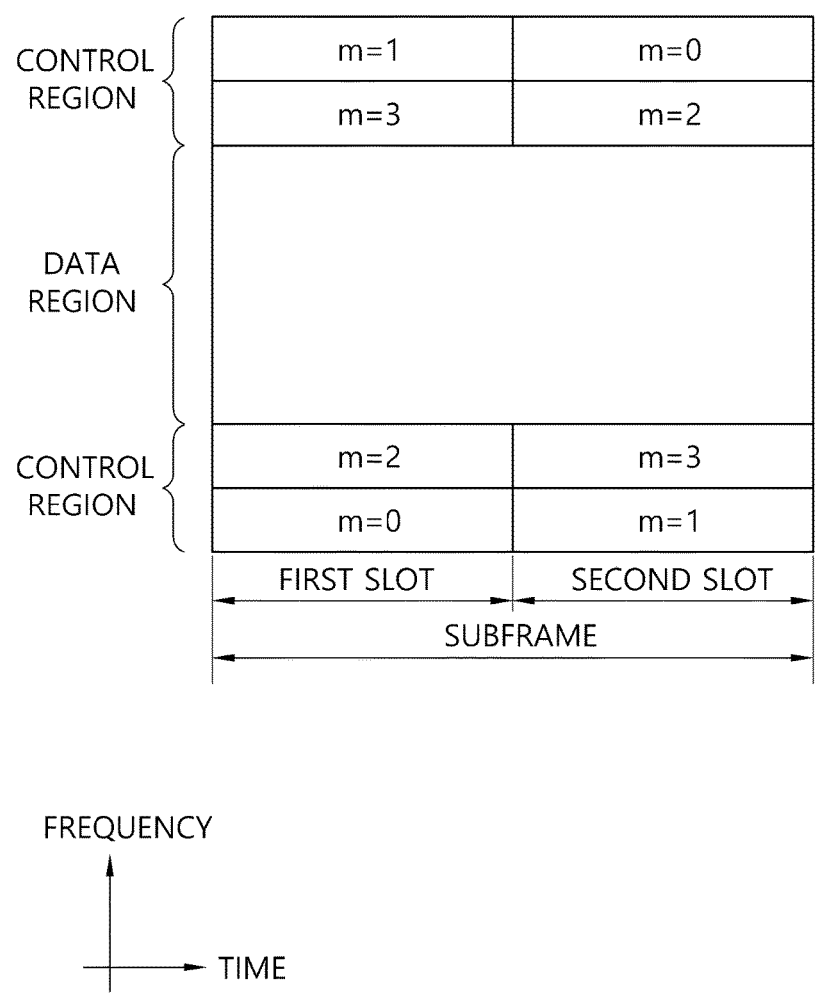
FIG. 6. illustrates a structure of an uplink subframe in 3GPP LTE.

FIG. 6. illustrates a structure of an uplink subframe in 3GPP LTE.

Referring to FIG. 6, an uplink subframe may be divided into a control region and a data region in a frequency domain. The control region is allocated a PUCCH for transmission of uplink control information. The data region is allocated a PUSCH for transmission of data (along with control information in some cases).

A PUCCH for one UE is allocated a RB pair in a subframe. RBs in the RB pair take up different subcarriers in each of first and second slots. A frequency occupied by the RBs in the RB pair allocated to the PUCCH changes with respect to a slot boundary, which is described as the RB pair allocated to the PUCCH having been frequency-hopped on the slot boundary.

A UE transmits uplink control information through different subcarriers according to time, thereby obtaining a frequency diversity gain. m is a location index indicating the logical frequency-domain location of an RB pair allocated for a PUCCH in a subframe.

Uplink control information transmitted on a PUCCH may include a HARQ ACK/NACK, a channel quality indicator (CQI) indicating the state of a downlink channel, a scheduling request (SR) which is an uplink radio resource allocation request, or the like.

A PUSCH is mapped to a uplink shared channel (UL-SCH) as a transport channel. Uplink data transmitted on a PUSCH may be a transport block as a data block for a UL-SCH transmitted during a TTI. The transport block may be user information. Alternatively, the uplink data may be multiplexed data. The multiplexed data may be the transport block for the UL-SCH multiplexed with control information. For example, control information multiplexed with data may include a CQI, a precoding matrix indicator (PMI), an HARQ, a rank indicator (RI), or the like. Alternatively, the uplink data may include only control information.

<Carrier Aggregation>

Hereinafter, a carrier aggregation (CA) system will be described.

The carrier aggregation (CA) system means aggregating multiple component carriers (CCs). By the carrier aggregation, the existing meaning of the cell is changed. According to the carrier aggregation, the cell may mean a combination of a downlink component carrier and an uplink component carrier or a single downlink component carrier.

Further, in the carrier aggregation, the cell may be divided into a primary cell, secondary cell, and a serving cell. The primary cell means a cell that operates at a primary frequency and means a cell in which the UE performs an initial connection establishment procedure or a connection reestablishment procedure with the base station or a cell indicated by the primary cell during a handover procedure. The secondary cell means a cell that operates at a secondary frequency and once an RRC connection is established, the secondary cell is configured and is used to provide an additional radio resource.

As described above, the carrier aggregation system may support a plurality of component carriers (CC), that is, a plurality of serving cells unlike a single carrier system.

The carrier aggregation system may support cross-carrier scheduling. The cross-carrier scheduling is a scheduling method that may perform resource allocation of the PDSCH transmitted through another component carrier through the PDCCH transmitted through a specific component carrier and/or resource allocation of the PUSCH transmitted through other component carrier other than the component carrier fundamentally linked with the specific component carrier.

<EPDCCH (Enhanced Physical Downlink Control Channel)>

Meanwhile, a PDCCH is monitored in a limited region called a control region within a subframe, and a CRS transmitted in the entire band is used for demodulation of the PDCCH. As types of control information are diversified and an amount of control information is increased, flexibility of scheduling only with the existing PDCCH is lowered. Also, in order to reduce a burden due to CRS transmission, an enhanced PDCCH (EPDCCH) has been introduced.

Figure 7:
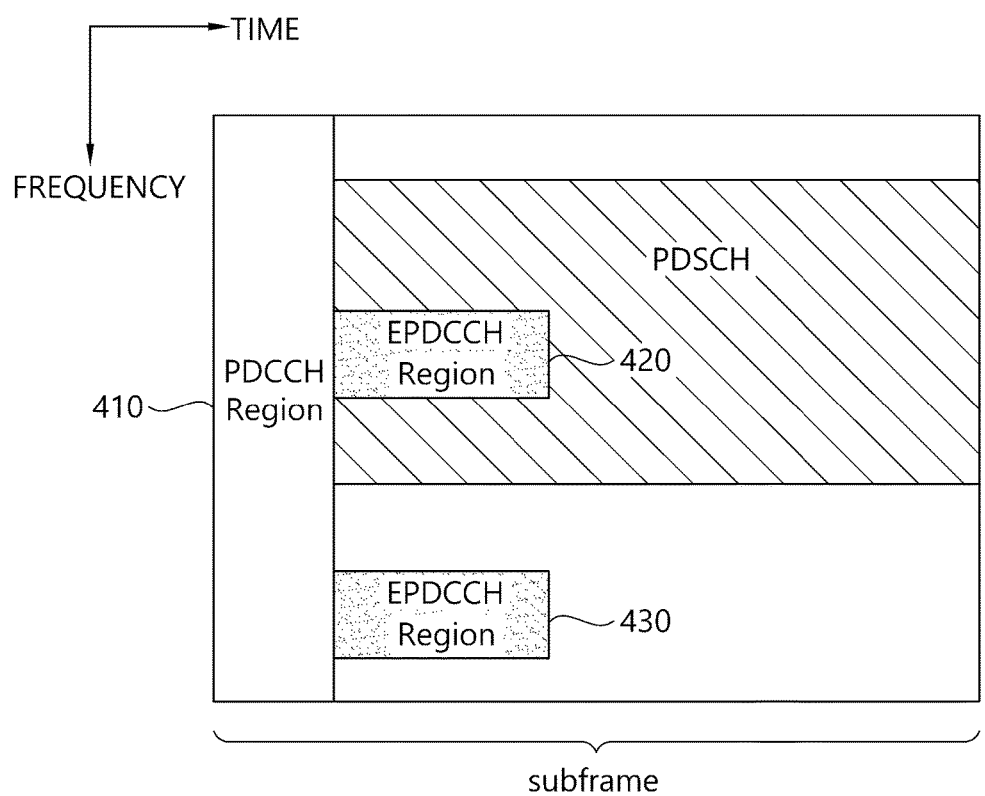
FIG. 7 illustrates an example of a subframe having an EPDCCH.

FIG. 7 illustrates an example of a subframe having an EPDCCH.

A subframe may include zero or one PDCCH region 4100 and zero or more PEDCCH regions 420 and 430.

The PEDCCH regions 420 and 430 are regions in which a wireless device monitors an EPDCCH. The PDCCH region 410 is positioned within a maximum of four preceding OFDM symbols, while the EPDCCH regions 420 and 430 may be flexibly scheduled in subsequent OFDM symbols after the PECCH region 410.

One or more EPDCCH regions 420 and 430 are designated in a wireless device, and the wireless device may monitor an EPDCCH in the designated EPDCCH regions 420 and 430.

The number/position/size of the EPDCCH regions 420 and 430 and/or information regarding a subframe for monitoring the PEDCCH may be provided by a BS to the wireless device through an RRC message, or the like.

In the PDCCH region 410, a PDCCH may be demodulated on the basis of a CRS. In the EPDCCH regions 420 and 430, a demodulation (DM) RS, rather than a CRS, may be defined to demodulate an EPDCCH. An associated DM RS may be transmitted in the EPDCCH regions 420 and 430.

Each of the EPDCCH regions 420 and 430 may be used to perform scheduling on different cells. For example, an EPDCCH within the EPDCCH region 420 may carry scheduling information for a primary cell and an EPDCCH within the EPDCCH region 430 may carry scheduling information for a secondary cell.

When an EPDCCH is transmitted in the EPDCCH regions 420 and 430 through multiple antennas, the same precoding as that of a DPCCH may be applied to a DM RS within the EPDCCH regions 420 and 430.

Compared with a PDCCH which uses a CCE as a transmission resource unit, a transmission resource unit for an EPDCCH is called an enhanced control channel element (ECCE). An aggregation level (AL) may be defined by a resource unit for monitoring an EEPDCCH. For example, when 1 ECCE is a minimum resource for an EPDCCH, an AL may be defined as AL={1, 2, 4, 8, 16}.

Hereinafter, an EPDCCH search space may correspond to an EPDCCH region. In the EPDCCH search space, one or more EPDCCH candidates may be monitored in one or more ALs.

Hereinafter, resource allocation for an EPDCCH will be described.

The EPDCCH is transmitted using one or more ECCEs. Each ECCE includes a plurality of enhanced resource element groups (EREEGs). An ECCH may include four eight EREGs according to a CP and a subframe type according to time division duplex (TDD) DL-UL. For example, in a normal CP, the ECCE may include 4 EREGs, and in an extended CP, the ECCE may include 8 EREGs.

A physical resource block (PRB) pair refers to two PRBs having the same RB number in one subframe. The PRB pair refers to a first PRB of a first slot and a second PRB of a second slot. In a normal CP, a PRB pair includes 12 subcarriers and 14 OFDM symbols, and thus, the PRB pair includes 168 source elements (REs).

The EPDCCH search space may be set as one or a plurality of PRB pairs. One PRB pair includes 16 EREGs. Thus, when an ECCE includes 4 EREGs, a PRB pair includes four ECCEs, and when an ECCE includes 8 EREGs, a PRB pair includes two ECCEs.

Figure 8:
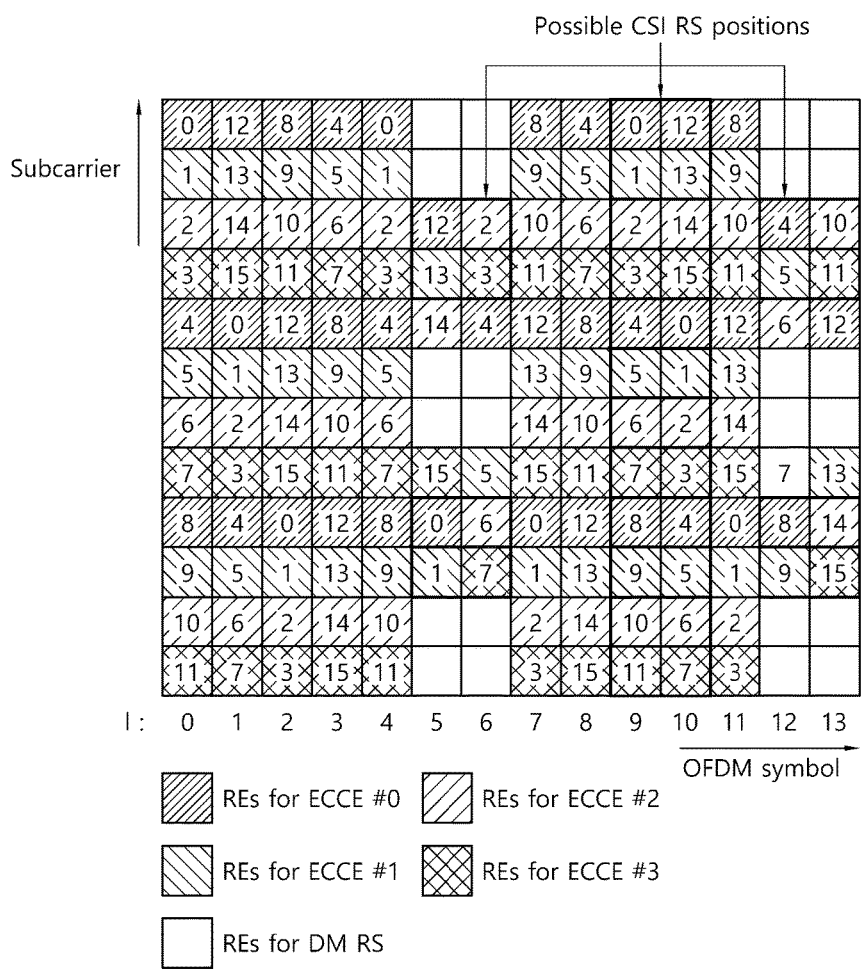
FIG. 8 illustrates an example of a PRB pair in one subframe.

FIG. 8 illustrates an example of a PRB pair in one subframe.

Hereinafter, it is assumed that a subframe includes two slots and a PRB pair includes 7 OFDM symbols and 12 subcarriers in one slot, the number of OFDM symbols and the number of subcarriers are merely an example.

In one subframe, a PRB pair includes 168 REs Thus, 1 EREG may include 9 REs. However, in one PRB pair, a CSI-RS or CRS may be disposed in addition to a DM RM. Here, the number of available REs may be reduced and the number of REs included in 1 EREG may be reduced. Although the number of REs included in an EREG may be reduced but the number of EREGs included in one PRB pair, i.e., 16, is not changed.

Here, as illustrated in FIG. 8, for example, REs may be sequentially indexed, starting from an upper first subcarrier of a left first OFDM symbol (1=0) (or REs may be sequentially indexed in an upward direction, starting from a lower first subcarrier of a left first OFDM symbol (1=0)). Here, it is assumed that 16 EREGs are indexed from 0 to 15. Here, 9 REs having an RE index 0 are allocated to EREG 0. Similarly, 9 REs corresponding to an RE index k (k=0, . . . , 15) are allocated to EREG k.

A plurality of EREGs are grouped to define an EREG group. For example, when an EREG group having four EREGs is defined, it may be defined such that EREG group #0={EREG 0, EREG 4, EREG 8, EREG 12}, EREG group #1={EREG 1, EREG 5, EREG 9, EREG 3}, EREG group #2={EREG 2, EREG 6, EREG 10, EREG 14}, and EREG group #3={EREG 3, EREG 7, EREG 11, EREG 15}. When en EREG group having 8 EREGs is defined, it may be defined such that EREG group #0={EREG 0, EREG 2, EREG 4, EREG 6, EREG 8, EREG 10, EREG 12, EREG 14} and EREG group #1={EREG 1, EREG 3, EREG 5, EREG 7, EREG 9, EREG 11, EREG 13, EREG 15}.

As described above, an ECCE includes 4 EREGs, and an ECCE may include 8 EREGs in an extended CP. An ECCE is defined by an EREG group. For example, FIG. 6 illustrates that ECCE #0 includes EREG group #0, ECCE #1 includes EREG group #1, ECCE #2 includes EREG group #2, and ECCE #3 includes EREG group #3.

ECCE-to-EREG mapping includes localized transmission and distributed transmission. In localized transmission, an EREG group forming one ECCE is selected from an EREG of one PRB pair. In distributed transmission, an EREG group forming one ECCE is selected from EREGs of different PRB pairs.

Unlike a PDCCH demodulated on the basis of a CRS to obtain a precoding gain, an EPDCCH is demodulated on the basis of a demodulation reference signal (DMRS).

Figure 9:
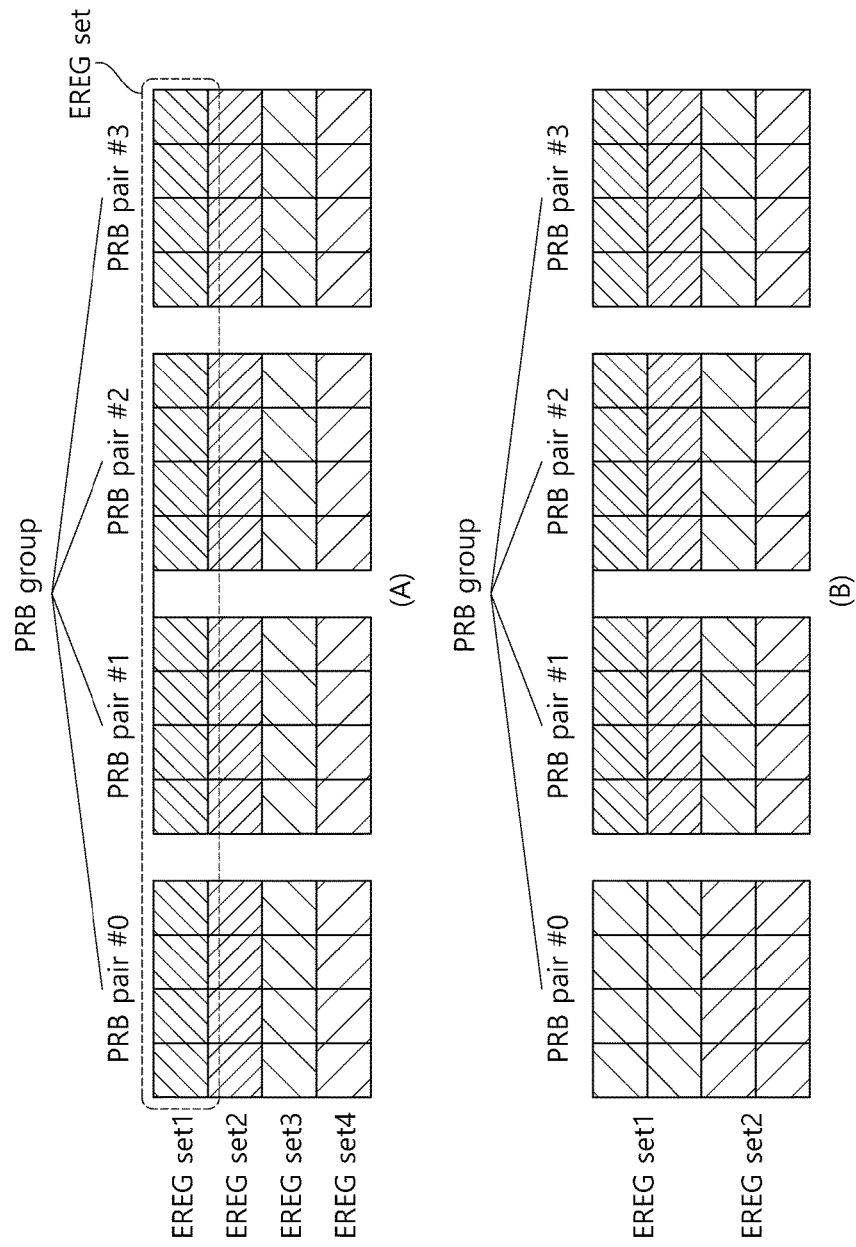
FIG. 9 illustrates an example of a PRB pair structure.

FIG. 9 illustrates an example of a PRB pair structure.

A PRB group includes four PRB pairs, but the number thereof is not limited thereto.

(A) of FIG. 9 illustrates an EREG set when an ECCE includes 4 EREGs, and (B) of FIG. 9 illustrates an EREG set when an ECCE includes 8 EREGs.

Hereinafter, it is assumed that one ECCE includes 4 EREGs unless otherwise mentioned.

An EPDCCH supports localized transmission and distributed transmission. In localized transmission, an EREG forming one ECCE is transmitted in one PRB pair. In distributed transmission, an EREG forming one ECCE is transmitted in a plurality of PRB pairs.

Figure 10:
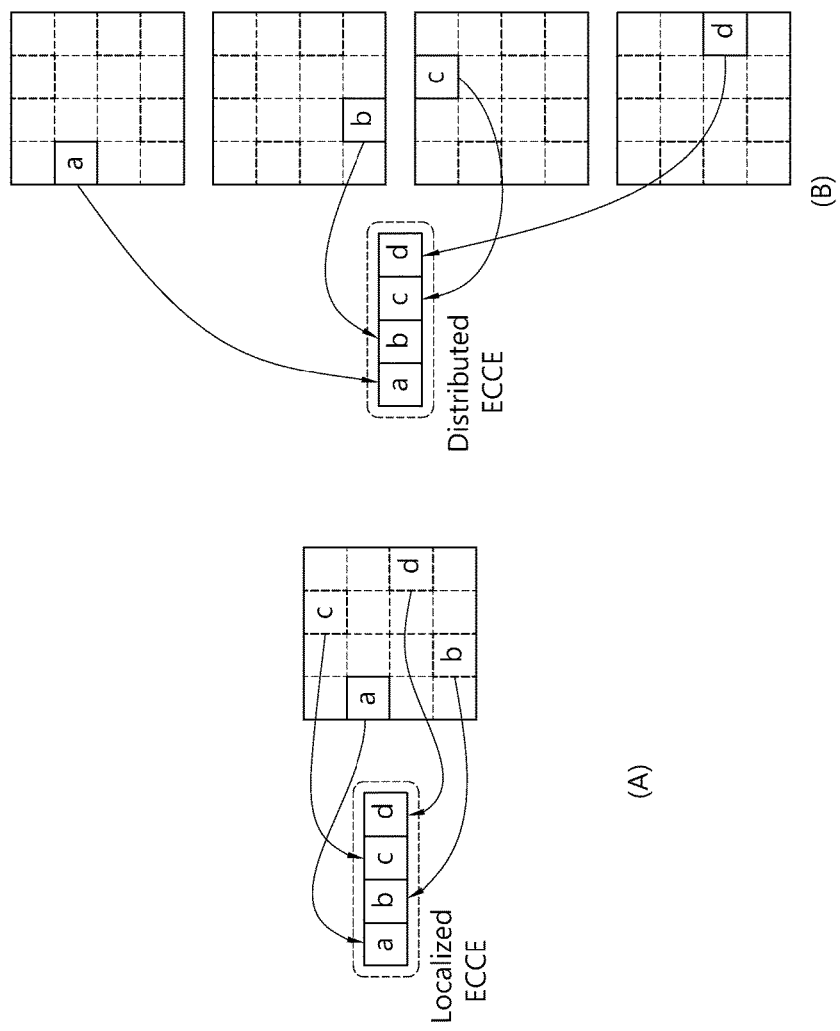
FIG. 10 illustrates an example of local transmission and distributed transmission.

FIG. 10 illustrates an example of localized transmission and distributed transmission.

(A) of FIG. 10 illustrates an example of ECCE-to-EREG mapping according to localized transmission. A local ECCE refers to an ECCE used in localized transmission. (B) of FIG. 10 illustrates an example of ECCE-to-EREG mapping according to distributed transmission. A distributed ECCE refers to an ECCE used in distributed transmission.

An EREG set refers to a set of EREGs used to form a localized ECCE or distributed ECCE. That is, the ECCE may include EREGs belonging to the same EREG set.

<Synchronization Signal>

Meanwhile, in the LTE/LTE-A system, synchronization with a cell is obtained through a synchronization signal (SS) in a cell search procedure.

Hereinafter, a synchronization signal will be described in detail with reference to the accompanying drawings.

Figure 11A:
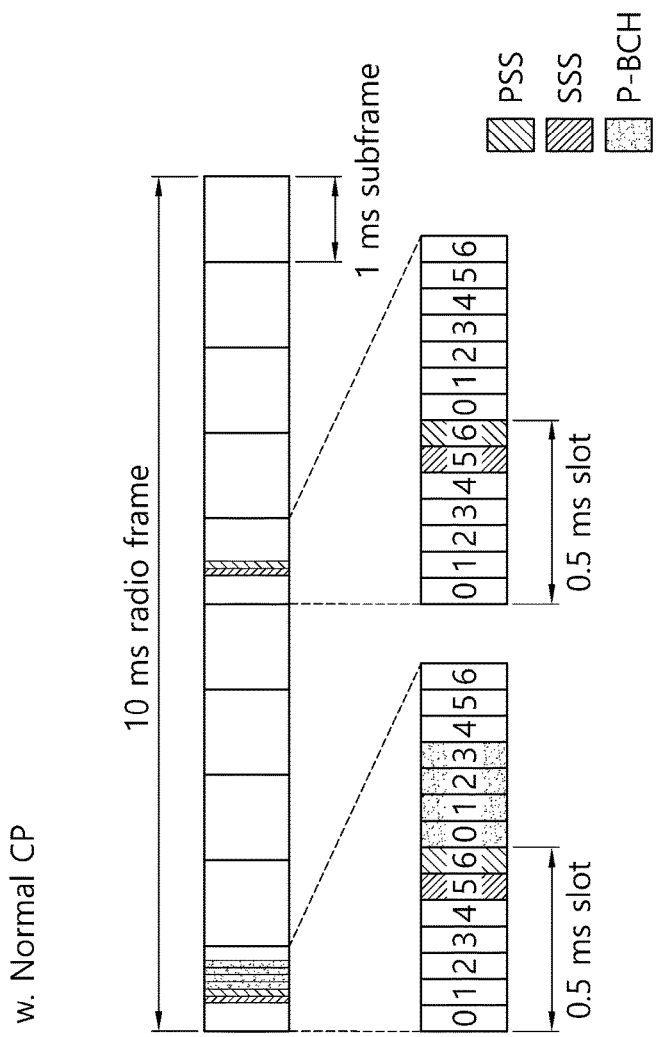
FIGS. 11A and 11B illustrate frame structures for synchronization signal transmission in a normal CP and extended CP, respectively.
Figure 11B:
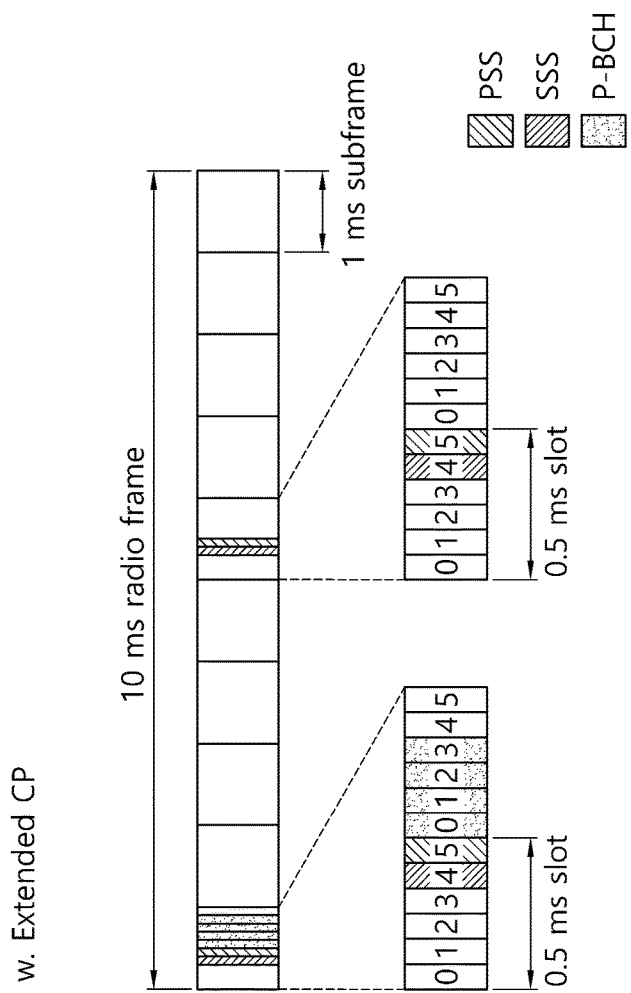

FIGS. 11A and 11B illustrate frame structures for transmitting a synchronization signal in a normal CP and an extended CP, respectively.

Referring to FIGS. 11A and 11B, a synchronization signal (SS) is transmitted in each of second slots of a subframe 0# and a subframe #5 in consideration of 4.6 ms of the length of a GSM frame to facilitate inter-RAT measurement, and a boundary regarding the corresponding radio frame may be detected through a secondary synchronization signal (S-SS).

A primary synchronization signal (P-SS) is transmitted in a final OFDM symbol of a corresponding slot, and an S-SS is transmitted in an OFDM symbol immediately in front of the P-SS.

The synchronization signal (SS) may transmit a total of 504 physical cell IDs through combination of 3 P-SSs and 168 S-SSs.

Also, an SS and a physical broadcast channel (PBCH) are transmitted within middle 6 RBs within a system bandwidth so that a user equipment (UE) may detect or decode the same, regardless of a transmission bandwidth.

<Machine Type Communication (MTC)>

Meanwhile, hereinafter, the MTC will be described.

Figure 12A:
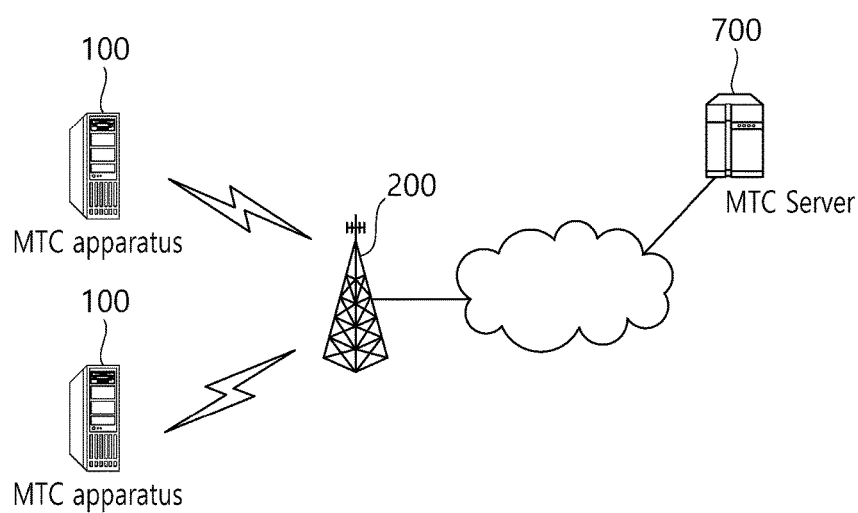
FIG. 12A illustrates an example of machine type communication (MTC).

FIG. 12a illustrates an example of the machine type communication (MTC).

The machine type communication (MTC) represents information exchange through between MTC devices 100 through a base station 200 or information exchange between the MTC device 100 and an MTC server 700 through the base station, which does not accompany human interaction.

The MTC server 700 is an entity which communicates with the MTC device 100. The MTC server 700 executes an MTC application and provides an MTC specific service to the MTC device.

The MTC device 100 as a wireless device providing the MTC may be fixed or mobile.

The service provided through the MTC has discrimination from a service in communication in which human intervenes in the related art and includes various categories of services including tracking, metering, payment, a medical field service, remote control, and the like. In more detail, the service provided through the MTC may include electric meter reading, water level measurement, utilization of a monitoring camera, reporting of an inventory of a vending machine, and the like.

As peculiarities of the MTC device, since a transmission data amount is small and uplink/downlink data transmission/reception often occurs, it is efficient to decrease manufacturing cost of the MTC device and reduce battery consumption according to the low data transmission rate. The MTC device is characterized in that mobility is small, and as a result, the MTC device is characterized in that a channel environment is not almost changed.

Meanwhile, the MTC is also called Internet of Things (IoT). Accordingly, the MTC device may be called an IoT device.

Figure 12B:
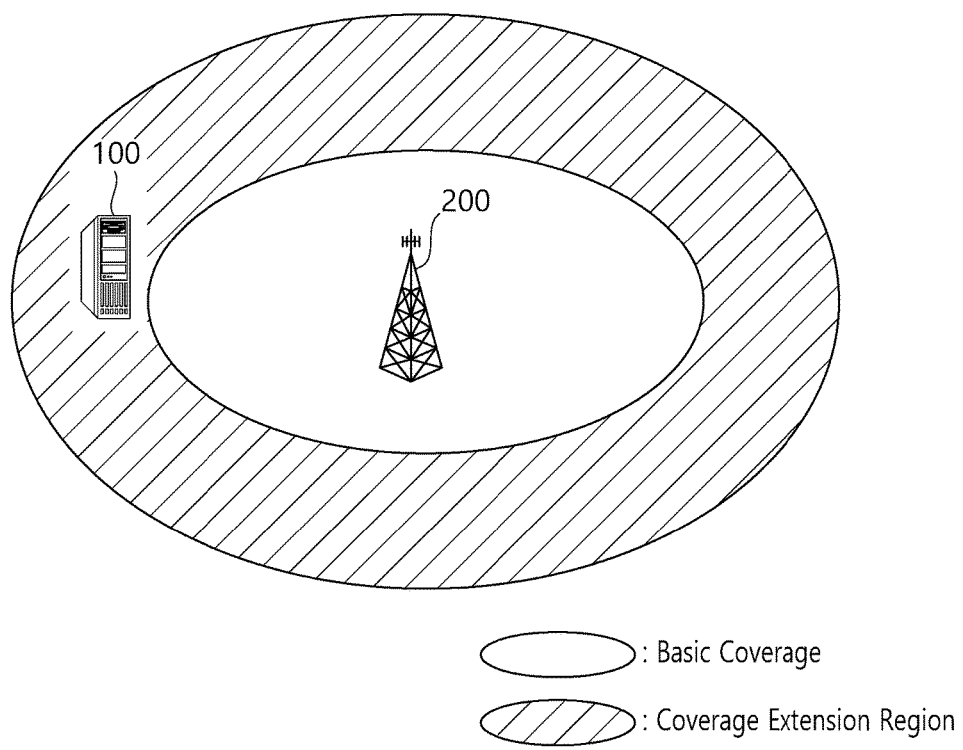
FIG. 12B illustrates extension or enhancement of cell coverage for an MTC device.

FIG. 12b illustrates an example of cell coverage extension for an MTC device.

In recent years, it is considered that cell coverage of the base station extends for the MTC device 100 and various techniques for the cell coverage extension are discussed.

However, in the case where the coverage of the cell extends, when the base station transmits a downlink channel to the MTC device positioned in the coverage extension area, the MTC device undergoes a difficulty in receiving the downlink channel.

Figure 13A:
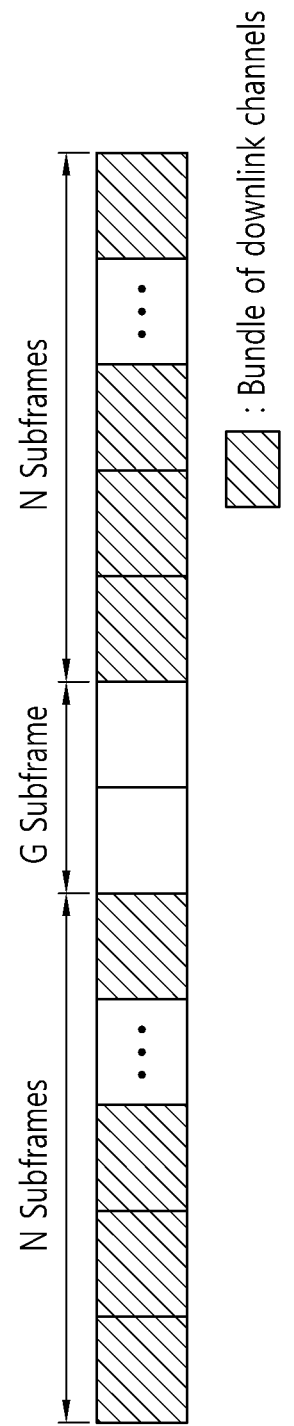
FIG. 13A illustrates an example of transmitting a bundle of downlink channels.

FIG. 13a is an exemplary diagram illustrating an example of transmitting a bundle of downlink channels.

As known with reference to FIG. 13a, the base station repeatedly transmits he downlink channel (for example, the PDCCH and/or PDSCH) to the MTC device positioned in the coverage extension area on multiple subframes (for example, N subframes). As described above, the downlink channels which are repeated on the multiple subframes are called a bundle of the downlink channels.

Meanwhile, the MTC device receives the bundle of the downlink channels on the multiple subframes and decodes a part or the entirety of the bundle to increase decoding success rate.

Figure 13B:
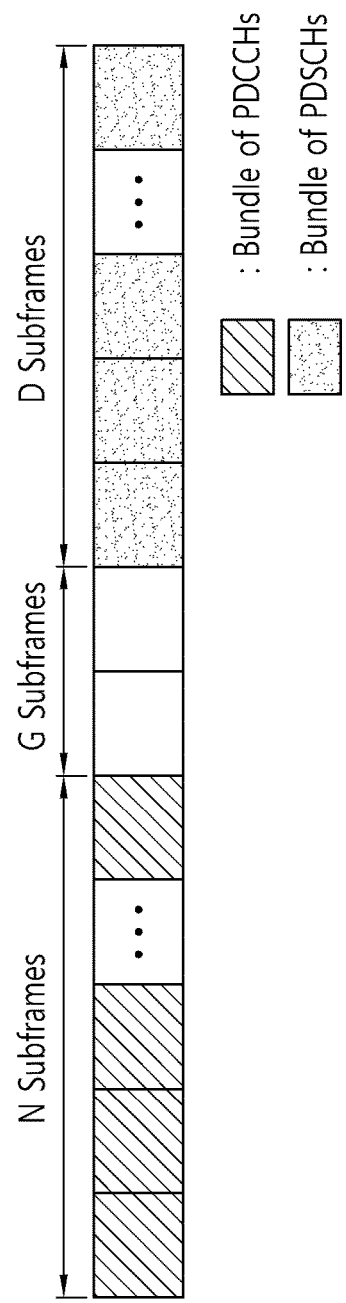
FIG. 13B illustrates an example of transmitting a bundle of PDCCHs and a bundle of PDSCHs.

FIG. 13B illustrates an example of transmission of a bundle of PDCCHs and a bundle of PDSCHs.

Referring to FIG. 13B, a BS may transmit a bundle of the same repeated PDCCHs on a plurality of (e.g., N number of) subframes to an MTC device positioned in a coverage extended area. Also, the BS may transmit a bundle of the same repeated PDSCHs on a plurality of (e.g., D number of) subframes. Here, the bundle of PDSCHs may be transmitted after a predetermined gap, e.g., after G number of subframes, after the bundle of PDSCHs is transmitted. That is, for example, in cases where transmission of the bundle of PDSCHs is finished on (N−1)th subframe, the bundle of PDSCHs may be transmitted on the D number of subframes, starting from (N+G)th subframe.

Meanwhile, similarly the MTC device positioned in the coverage extended area may also transmit a bundle of uplink channels (e.g., PUSCHs and/or PUSCHs) on several subframes to the BS.

Figure 14A:
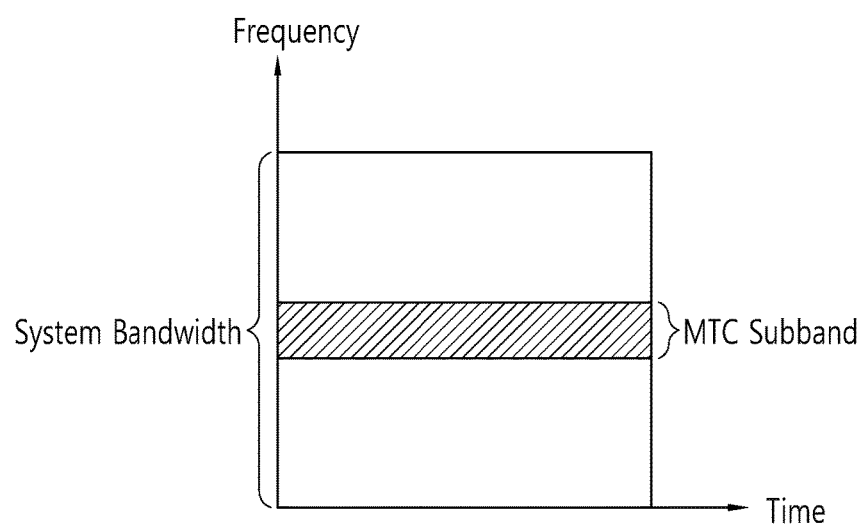
FIGS. 14A and 14B illustrate an example of a subband in which an MTC device operates.
Figure 14B:
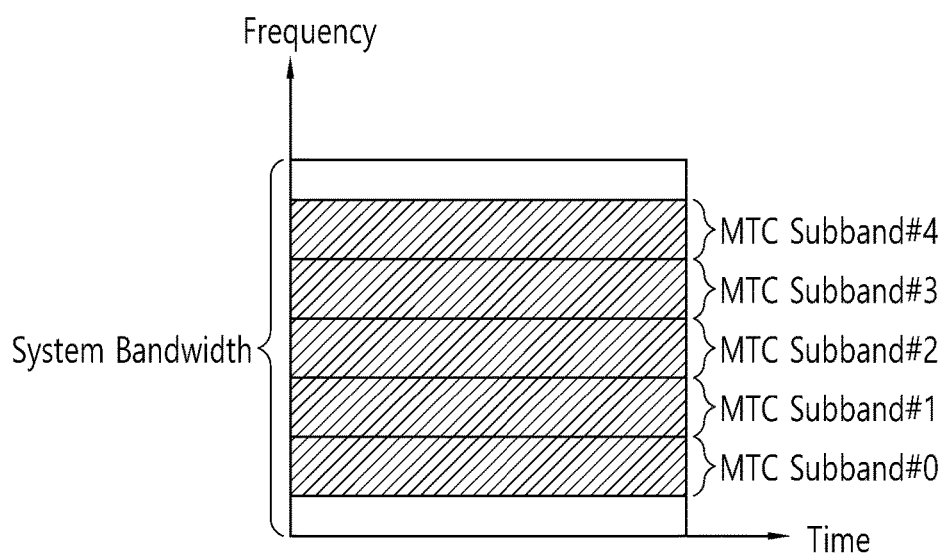

FIGS. 14A and 14B illustrate an example of a subband in which an MTC device operates.

In order to reduce cost of an MTC device, the MTC device may use a subband of about 1.4 MHz, for example, regardless of system bandwidth of a cell as illustrated in FIG. 14A.

Here, a region of a subband in which the MTC device operates may be positioned in a central region (e.g., six middle Ps) of a system bandwidth of the cell as illustrated in FIG. 14A.

Alternatively, as illustrated in FIG. 14B, for multiplexing within a subframe between MTC devices, several subbands of an MTC device are provided in one subframe to use different subbands between the MTC devices. Here, most MTC devices may use a subband other than the central region (e.g., six middle PRBs) of a system band of the cell.

Meanwhile, the MTC device operating in the reduced some bands cannot properly receive an existing PDSCH transmitted from the BS on the entire system bands. Also, when multiplexing with a PDCCH transmitted to another general UE is considered, it may not be preferred for a cell to transmit a PDCCH for the MTC device in an existing OFDM symbol region in which the PDCCH is transmitted.

In order to solve this, a control channel for an MTC device transmitted within a subband in which the MTC device of low-complexity/low-specification/low-cost operates is required to be introduced.

Figure 15:
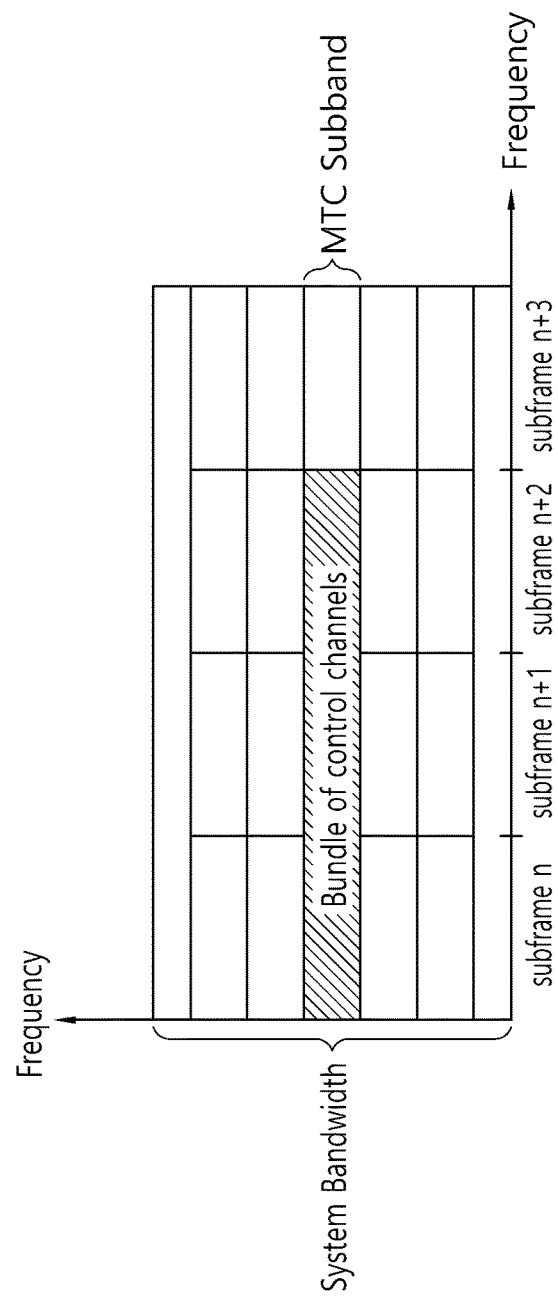
FIG. 15 illustrates an example of a control channel transmitted in a subband in which an MTC device operates.

FIG. 15 illustrates an example of a control channel transmitted within a subband in which an MTC device operates.

As can be seen with reference to FIG. 15, the MTC device operates in a certain MTC subband of a system bandwidth of the cell, rather than operating using the entire system bandwidths of the cell, the BS may transmit a control channel for the MTC device within the subband of the MTC. Such a control channel may be repeatedly transmitted on a plurality of subframes.

The control channel may be similar to an existing EPDCCH. That is, a control channel for the MTC device may be generated using an existing EPDCCH as is. Or, a control channel (or M-PDCCH) for the MTC device may be a form deformed from an existing PDCCH/EDPCCH.

Hereinafter, the control channel for the MTC device of low-complexity/low-specification/low-cost will be referred to as an MTC-EPDCCH or M-PDCCH. Such an MTC-EPDCCH or M-PDCCH may be used for an MTC device or may also be used for a UE of low-complexity/low-specification/low-cost or a UE positioned in a coverage extended or coverage enhanced area.

Figure 16:
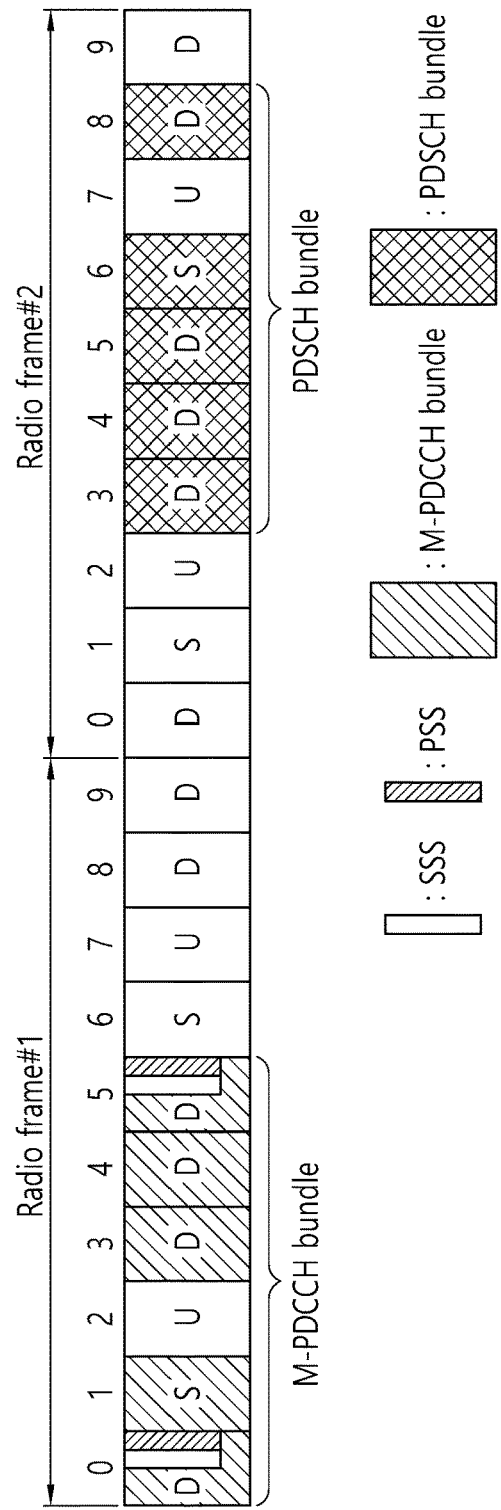
FIG. 16 shows an example in which M-PDCCH/PDSCH is repeatedly transmitted on a TDD subframe.

FIG. 16 shows an example in which M-PDCCH/PDSCH is repeatedly transmitted on a TDD subframe.

Referring to FIG. 16, radio frames to which the TDD configuration 2 shown in the table 1 is applied are exemplarily shown. In this connection, the base station may repeatedly transmit the PDSCH on the plurality of subframes as shown.

However, when the subframe on which the PDSCH is transmitted corresponds to the TDD special subframe, only the DwPTS among the special subframe can be used for the PDSCH transmission, as shown in FIG. 2 and the GP and the UpPTS cannot be used for the PDSCH transmission. In this way, since the PDSCH transmission is limited to transmission on the DwPTS among the special subframe, the number of REs that can be used for the PDSCH transmission on the special subframe is smaller than that of the general DL subframe. Considering this, when the MTC device determines the transport block size (TBS) used for receiving the PDSCH, the device may determine that the transport block size (TBS) on the special subframe is smaller than the transport block size (TBS) on the general DL subframe. That is, the transport block sizes (TBS) are different between the special subframe and the general DL subframe. Therefore, the MTC device cannot expect the base station to transmit the same PDSCH over a plurality of subframes.

Meanwhile, the base station may transmit the M-PDCCH on a plurality of subframes. However, when the PSS/SSS is also transmitted on the subframe, the RE used for transmitting the M-PDCCH and the RE used for transmitting the PSS/SSS may collide with each other. Thus, using the corresponding RE, the M-PDCCH may not be transmitted. Accordingly, the REs that may be used to transmit MTC-EPDCCH or M-PDCCH may be different between subframes. This makes it difficult to transmit the same MTC-EPDCCH or M-PDCCH on a plurality of subframes Embodiments of the Present Disclosure Accordingly, embodiments of the present disclosure aim to provide a solution to this problem. Hereinafter, in the present disclosure, an MTC device having low-complexity/low-capability/low-specification/low-cost is referred to as an LC device.

First, according to the embodiment of the present disclosure, coverage extension/enhancement (CE) may be classified into two modes.

A first mode (also referred to as CE mode A) is a mode for repetitive transmission, or for a small number of repetitive transmissions.

The second mode (also referred to as CE mode B) is a mode in which a large number of repetitive transmissions are allowed.

Information on which mode to operate among the above two modes may be signaled to the LC device.

In this connection, some physical channels may be repetitively transmitted the same number of times regardless of whether the current mode is CE mode A or CE mode B.

That is, an embodiment of the present disclosure suggests a method by which the base station transmits the data channel and the control channel for the MTC device to the MTC device on a special subframe instead of a general DL subframe or on an MBSFN subframe, or on a subframe on which the PSS/SSS/PBCH is transmitted. Further, an embodiment of the present disclosure also provides a method by which the MTC device receives the data channel and the control channel for the MTC device from the base station on a special subframe instead of a general DL subframe or on an MBSFN subframe, or on a subframe on which the PSS/SSS/PBCH is transmitted.

I. A First Embodiment of the Present Disclosure: Special Subframe

As described above, the special subframe in the TDD radio frame may also be used for repetitive transmission of the PDSCH. The number of REs that can be used for PDSCH transmissions within the special subframe is smaller than the number of REs that can be used for PDSCH transmissions within the general DL subframe. Therefore, the transport block size (TBS) calculated for the general subframe by the MTC device and the transport block size (TBS) calculated for the special subframe by the MTC device are different.

Particularly, in the current LTE/LTE-A standard, the conventional general UE determines the transport block size for the general subframe and the transport block size for the special subframe to be different from each other even though the PRB size is the same therebetween and MCS (modulation and coding scheme) index is the same therebetween. Specifically, with reference to the current LTE/LTE-A standard, it is as follows:

TABLE 3

In order for UE to determine the modulation order and the size of the transport block (TB) in the PDSCH, the UE reads 5 bits of "modulation and coding scheme" field ($I_{MCS}$) in the DCI. Next, the UE configures $N'_{PRB}$ based on the number of all PRBs allocated for the PDSCH. When the transport block of the PDSCH is received on the DwPTS of TABLE 3-continued the special subframe, and the special subframe configuration 9 having the normal CP is used, or the special subframe configuration 7 having the extension CP is used, the $N_{PRB}$ is calculated as follows: $N_{PRB}$ = max $\{\lfloor N'_{PRB} \times 0.375 \rfloor, 1\}$. When other special subframe configurations are used, the NPRB is calculated as follows: $N_{PRB}$ = max $\{\lfloor N'_{PRB} \times 0.75 \rfloor, 1\}$. When the general DL subframe is used, the NPRB is calculated as follows: $N_{PRB}$ = $N'_{PRB}$. Using $I_{MCS}$, the UE determines TBS index ($I_{TBS}$). Based on the TBS index ($I_{TBS}$) and the $N_{PRB}$ value, TBS corresponding to the determined TBS index ($I_{TBS}$) and the calculated $N_{PRB}$ is obtained from a table in which TBSs are predefined based on TBS indexes ($I_{TBS}$) and $N_{PRB}$s.

As described above, according to the conventional LTE/LTE-A standard, the $N_{PRB}$ for the special subframe is calculated to be smaller than the $N_{PRB}$ for the general DL subframe, so that the transport block size (TBS) for the special subframe is determined to be smaller than that for the general DL subframe.

Therefore, when complying with the conventional LTE/LTE-A standard, the MTC device cannot expect the base station to transmit the same PDSCH over multiple subframes. Thus, in the first embodiment of the present disclosure, regardless of whether the PDSCH bundle transmission starts on the special subframe, the MTC device calculates the transport block (TB) size based on the general DL subframe. That is, the first embodiment of the present disclosure suggests that IBS should be determined as shown in the following table.

TABLE 4

When the MTC device corresponds to a device with low-complexity/low-specification/low-cost, or when the device is configured for coverage enhancement (CE), in order to determine the modulation order and transport block size (TBS) in PDSCH, the device reads the "modulation and coding scheme" field ($I_{MCS}$) in the DCI. Next, $N'_{PRB}$ is configured by the device based on the number of all PRBs allocated to the PDSCH. Next, the $N_{PRB}$ is calculated as follows, without distinguishing between the special subframe and the general DL subframe: $N_{PRB}$ = $N'_{PRB}$. Using $I_{MCS}$, the UE determines TBS index ($I_{TBS}$). Based on the TBS index ($I_{TBS}$) and the $N_{PRB}$ value, TBS corresponding to the determined TBS index ($I_{TBS}$) and the calculated $N_{PRB}$ is obtained from a table in which TBSs are predefined based on TBS indexes ($I_{TBS}$) and $N_{PRB}$s.

Thus, in the first embodiment of the present disclosure, when the MTC device corresponds to a device with low-complexity/low-specification/low-cost, or when the device is configured for coverage enhancement (CE), the $N_{PRB}$ may be calculated to b NPRB=N'PRB, regardless of whether a subframe on which the PDSCH is received is the special subframe or not. This will be described in more detail with reference to FIG. 14 later.

Figure 17:
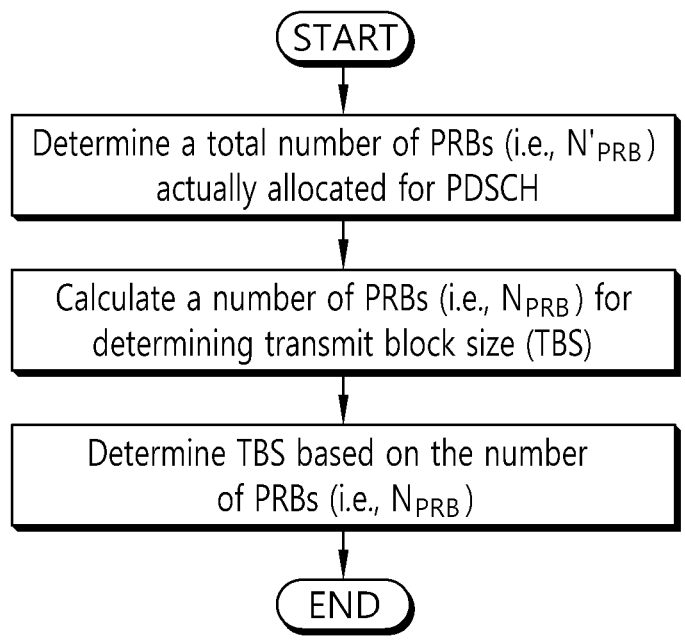
FIG. 17 shows a procedure for determining a transport block size (TB S) according to one embodiment of the present disclosure.

FIG. 17 shows a procedure for determining a transport block size (TBS) according to one embodiment of the present disclosure.

Referring to FIG. 17, the total number of physical resource blocks (PRB) actually allocated for the PDSCH is determined, and $N'_{PRB}$ is configured based on the determination result. Next, the number of PRBs ($N_{PRB}$) used to determine the transport block size (TBS) in the PDSCH is calculated. In this connection, if the device is not an LC device, or if the device is not configured for coverage enhancement (CE), and the PDSCH is received on a TDD-based special subframe, the number of PRBs ($N_{PRB}$) used for determining the TBS is calculated to be smaller than the total number ($N'_{PRB}$) of the actual PRBs allocated for the PDSCH. If the device is an LC device, or if the device is configured for coverage enhancement (CE), regardless of whether the PDSCH is received on a TDD-based special subframe, the number of PRBs used to determine the TBS ($N_{PRB}$) may be calculated to be equal to the total number of actual PRBs allocated for the PDSCH ($N'_{PRB}$).

Next, the transport block size (TBS) in the PDSCH is determined based on the number ($N_{PRB}$) of the calculated PRBs. In this connection, if the device is not configured for CE, regardless of whether the total number of actual PRBs ($N'_{PRB}$) on the TDD-based downlink subframe is equal to the total number ($N'_{PRB}$) of actual PRBs on the TDD-based special subframe, the TBS on the TDD-based downlink subframe may be determined to be different from the TBS on the TDD-based special subframe. However, if the device is an LC device or if the device is configured for the CE, the TBS may be determined based on the total number of actual PRBs ($N'_{PRB}$)=the number of PRBs ($N_{PRB}$), without distinguishing between the TDD-based downlink (DL) subframe and TDD-based special subframe.

Hereinafter, a second embodiment of the present disclosure will be described.

II. Second Embodiment of the Present Disclosure: Subframe on which PSS/SSS/PBCH is Transmitted Transmission of the control channel (MTC-EPDCCH or M-PDCCH) for the MTC may be transmitted via the following transmission schemes:

Localized transmission scheme: in the similar manner to localized transmission of EPDCCH, MTC-EPDCCH or M-PDCCH is transmitted through at least one antenna port of a plurality of antenna ports (e.g., 107, 108, 109, 110). The DMRS may be transmitted as a reference signal. EREGs constituting ECCEs are adjacent to each other. The MTC-EPDCCH or M-PDCCH may be transmitted by a candidate (randomly selected) among multiple candidates.

Distributed transmission scheme: In the same manner as distributed transmission of EPDCCH, MTC-EPDCCH or M-PDCCH may be transmitted through a plurality of antenna ports (e.g., antenna ports 107 and 109). The DMRS may be transmitted as a reference signal. In order to obtain the diversity gain, the EREGs constituting the ECCE may be spaced apart from each other in the EPDCCH-PRB-set, and random beamforming may be used for each antenna port and each PRB. The MTC-EPDCCH or M-PDCCH may be transmitted by a candidate (randomly selected) among multiple candidates.

Space Frequency Block Coding (SFBC) transmission: The CCE-to-RE mapping and transmission scheme is based on the conventional PDCCH. However, the OFDM symbols for PDCCH monitoring are defined as OFDM symbol #X to OFDM symbol # X+Y, where X+Y is less than or equal to 13. In this connection, OFDM symbols #0 to # Y−1 are used for transmission of the conventional PDCCH. The MTC-EPDCCH or M-PDCCH may be transmitted by a candidate (randomly selected) among multiple candidates.

Figure 18:
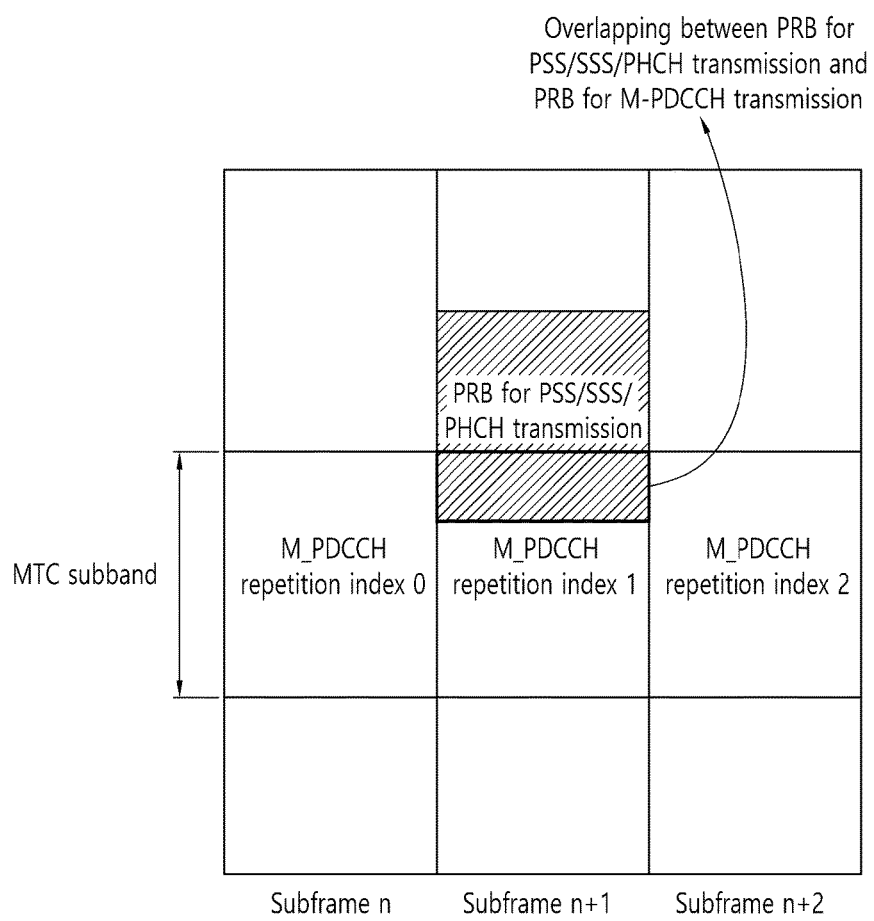
FIG. 18 shows an example in which PSS/SSS/PBCH and a control channel (MTC-EPDCCH or M-PDCCH) for MTC collide with each other.

However, the RE resource used to transmit the control channel (MTC-EPDCCH or M-PDCCH) for the MTC may conflict with the RE resource used to transmit the PSS/SSS or PBCH. With reference to FIG. 18, this will be described.

FIG. 18 shows an example in which PSS/SSS/PBCH and a control channel (MTC-EPDCCH or M-PDCCH) for MTC collide with each other.

Referring to FIG. 18, the base station repetitively transmits a control channel (MTC-EPDCCH or M-PDCCH) for the MTC on the subframe n to the subframe n+2. In this connection, when the BS transmits the PSS/SSS/PBCH on the subframe n+1, some REs of the PRBs used for transmission of the PSS/SSS/PBCH may be overlapped with some of the PRBs used to transmit the control channel (MTC-EPDCCH or M-PDCCH) for the MTC.

Specifically, when the MTC-EPDCCH or the M-PDCCH is transmitted via the transmission scheme of the conventional PDCCH, as in the SFBC transmission mentioned above, the RE resource used for transmission of the MTC-EPDCCH or the M-PDCCH may conflict with the RE resource used for transmission of PSS/SSS/PBCH.

Further, it may be assumed that MTC-EPDCCH or M-PDCCH is transmitted via the localized transmission or distributed transmission like the conventional EPDCCH. The conventional EPDCCH is not transmitted using the PRB region used for PSS/SSS or PBCH transmission, on the subframe on which PSS/SSS or PBCH is transmitted. That is, if all or some of the REs corresponding to candidate REs for the transmission of the conventional EPDCCH on the subframe on which the PSS/SSS or PBCH is transmitted are present in the PRB region used for transmission of the PSS/SSS or PBCH, the resource candidates for the transmission of the EPDCCH may not be used for EPDCCH transmission. When this conventional scheme is applied to the MTC-EPDCCH or the M-PDCCH as it is, the REs that may be used to transmit the MTC-EPDCCH or the M-PDCCH may be different between the subframes. Therefore, it becomes difficult to transmit the same MTC-EPDCCH or M-PDCCH on the plurality of subframes.

Therefore, the second embodiment of the present disclosure may allow a control channel (MTC-EPDCCH or M-PDCCH) for MTC to be transmitted using a PRB resource used to transmit PSS/SSS or PBCH on the subframe on which PSS/SSS or PBCH are transmitted.

Hereinafter, this second embodiment will be described in detail.

II-1. Control Channel for MTC (MTC-EPDCCH or M-PDCCH)

First Approach

First, according to the first approach, when in the subframe on the PSS/SSS or PBCH is transmitted, an RE resource used for transmitting a control channel (MTC-EPDCCH or M-PDCCH) for the MTC overlaps with an RE resource used for transmitting the PSS/SSS or PBCH, the base station may rate-match or puncture the control channel (MTC-EPDCCH or M-PDCCH) for the MTC on the corresponding RE resource. That is, when intending to map the control channel (MTC-EPDCCH or M-PDCCH) for the MTC to an RE resource included in decoding candidates thereof, if the corresponding RE resource is also used for transmission of the PSS/SSS or PBCH as shown in FIG. 18, the base station may preform puncturing of the control channel for the MTC on the corresponding RE resource or may perform the rate-matching of the control channel for the MTC, except for the corresponding RE resource. In this connection, when the control channel (MTC-EPDCCH or M-PDCCH) for the MTC is transmitted using the SFBC transmission scheme, the mapping may be performed assuming that the PSS/SSS and/or PBCH are not transmitted using the REs constituting each decoding candidate.

Accordingly, the MTC device may be configured to assume that the control channel (MTC-EPDCCH or M-PDCCH) for the MTC is punctured on the RE resource used for receiving the PSS/SSS or PBCH, or the control channel (MTC-EPDCCH or M-PDCCH) is rate-matched except for the RE resource used for receiving the PSS/SSS or PBCH. In this manner, the MTC device may expect that the base station transmits the same MTC-EPDCCH or M-PDCCH on a plurality of subframes.

Second Approach

When, in the PRB region used for transmission of PSS/SSS and not used for transmission of PBCH, the RE resource used to transmit the control channel (MTC-EPDCCH or M-PDCCH) for the MTC overlaps with the RE resource used to transmit the PSS/SSS, the base station may be configured to execute puncturing of the control channel (MTC-EPDCCH or M-PDCCH) for the MTC on the overlapping RE resource, as shown in FIG. 18, or to execute the rate-matching of the control channel (MTC-EPDCCH or M-PDCCH) for the MTC, except for the overlapping RE resource.

On the other hand, if the base station transmits the PSS/SSS and the PBCH together using a single PRB, there will be few RE resources to be used to transmit the control channel (MTC-EPDCCH or M-PDCCH) for the MTC. Therefore, if all or some of the REs constituting the decoding candidates for transmission of the control channel (MTC-EPDCCH or M-PDCCH) for the MTC are present in the PRB region for transmitting both the PSS/SSS and the PBCH, the base station may disallow the corresponding decoding candidate for transmission of the control channel (MTC-EPDCCH or M-PDCCH) for the MTC.

Third Approach

When a base station transmits the control channel (MTC-EPDCCH or M-PDCCH) for MTC using the SFBC transmission scheme, it is possible to exclude or skip the RE resource used for transmission of the PSS/SSS and/or PBCH from the RE resource constituting the decoding candidate. That is, when configuring a REG for transmission of the control channel for the MTC, the RE resource used to transmit the PSS/SSS and/or PBCH may be skipped and the REG may be configured via the rate matching. Alternatively, the configuration of the REG is done by ignoring the RE resources used for PSS/SSS and/or PBCH transmission, wherein when configuring the CCE, a REG that conflicts with an RE resource used for transmission of the PSS/SSS and/or PBCH may be excluded from the REG resources constituting the CCE, and the CCE may be configured via the rate matching. Alternatively, the configuration of the REG/CCE is done by ignoring the RE resources used for PSS/SSS and/or PBCH transmission, wherein when constructing the decoding candidate, a CCE that conflicts with the RE resource used to transmit the PSS/SSS and/or PBCH may be excluded from the CCE resource constituting the decoding candidate and then, the decoding candidate may be configured via the rate matching.

Fourth Approach

When a base station transmits the control channel (MTC-EPDCCH or M-PDCCH) for MTC using the SFBC transmission scheme, the base station assumes that, using the RE resource composing the decoding candidate, the PSS/SSS and/or PBCH are not transmitted. If all or some of the RE resources constituting the decoding candidate collide with the RE resource used to transmit the PSS/SSS or PBCH, the MTC device may assume that, using the corresponding decoding candidate, the control channel (MTC-EPDCCH or M-PDCCH) for the MTC is not transmitted from the base station thereto.

Fifth Approach

When the base station transmits the control channel (MTC-EPDCCH or M-PDCCH) for MTC using the localized transmission scheme or the distributed transmission scheme, and when a PRB used for PSS/SSS and/or PBCH transmission is included in the PRB region used for monitoring the control channel by the MTC device, the PRB region used for PSS/SSS and/or PBCH transmission may be excluded from the PRB region (i.e., EPDCCH-PRB-set) used to monitor the control channel by the MTC device.

Alternatively, when the base station transmits the control channel (MTC-EPDCCH or M-PDCCH) for MTC using the localized transmission scheme or the distributed transmission scheme, and when a PRB used for PSS/SSS and/or PBCH transmission is included in the PRB region used for monitoring the control channel by the MTC device, the PRB region used for PSS/SSS and/or PBCH transmission may be excluded from the PRB region (i.e., EPDCCH-PRB-set) used to monitor the control channel by the MTC device, in the subframe on which the PSS/SSS and/or PBCH are transmitted.

For example, when the MTC device monitors the control channel (MTC-EPDCCH or M-PDCCH) for MTC over the four PRBs, and two of the four PRBs overlap the PRB region used for PSS/SSS and/or PBCH transmission, the MTC device may assume that, in the corresponding subframe, the control channel (MTC-EPDCCH or M-PDCCH) for the MTC is transmitted using two PRBs, except for the two PRBs used for PSS/SSS and/or PRB transmission.

II-2. Transmission of DMRS

When the control channel (MTC-EPDCCH or M-PDCCH) for the MTC is transmitted according to the localized transmission scheme or the distributed transmission scheme, and a control channel (MTC-EPDCCH or M-PDCCH) for the MTC is transmitted using a PRB region used for PSS/SSS and/or PRB transmission, in order for the control channel to be correctly decoded by the MTC device, the base station may also transmit the DMRS in the corresponding PRB, or the MTC device should be able to perform channel estimation through other methods.

Thus, this embodiment may suggest an approach by which the MTC device may perform channel estimation, when the control channel (MTC-EPDCCH or M-PDCCH) for the MTC is transmitted using the PRB region used for PSS/SSS and/or PRB transmission by the BS. The following approaches are equally applicable to control channel (MTC-EPDCCH or M-PDCCH) transmissions for MTC and DMRS-based PDSCH transmissions.

First Approach

When a base station transmits the MTC-EPDCCH or M-PDCCH to be decoded based on the DMRS using the PRB used for PSS/SSS and/or PBCH transmission, the base station may not transmit the DMRS using the REs allocated to both of PSS/SSS and/or PBCH transmission and DMRS transmission. For example, the DMRS is punctured (or rate-matched) on OFDM symbols #5 and #6 of a first slot used to transmit the PSS/SSS, while the DMRS is transmitted only using OFDM symbols #5 and #6 of a second slot.

In this case, the channel estimation performance by the MTC device decreases. However, for coverage enhancement (CE), the M-PDCCH (or MTC-EPDCCH) is repetitively transmitted over a plurality of subframes, and DMRS is repetitively transmitted over the plurality of subframes. Thus, when cross-subframe channel estimation (channel estimation on another subframe) is used, there is no significant effect on performance. However, if the MTC device is not configured for coverage enhancement (CE) and therefore no repetitive transmission is performed, channel estimation performance may be reduced. To solve this performance reduction problem, it may be considered to increase the density of the DMRS. To this end, the following examples may be envisioned.

In a first example, the base station may allow antenna ports 107/108 to use DMRS RE resources reserved for use by antenna ports 109/110 respectively. That is, the configuration may be changed such that both of the DMRS RE resource reserved for use by the antenna ports 107/108 and the DMRS RE resources reserved for use by the antenna port 109/110 are used by the antenna ports 107/108. In this case, the available antenna ports are the antenna ports 107 and 108, and thus are reduced from four ports to two ports. However, the DMRS RE resources for each antenna port are doubled, and, thus, the effect of increasing the density of the DMRS is obtained. Therefore, when M-PDCCH (or MTC-EPDCCH) is received through the antenna ports 107/108, the MTC device assumes that the DMRS is received using DMRS RE resources for the antenna ports 107/108 and DMRS RE resources for the antenna port 109/110. This example may only be applied to the localized transmission scheme.

As a second example, the antenna ports 109/110 and antenna ports 107/108 may be in a quasi co-location (QCL) relationship. In this case, when the base station transmits the control channel (MTC-EPDCCH or M-PDCCH) for the MTC using the antenna ports 107/108, the DMRS transmitted using the antenna ports 107/108 and the DMRS transmitted using the antenna ports 109/110 both may be transmitted. In this connection, when M-PDCCH (or MTC-EPDCCH) is received using the antenna port 107/108, the DMRS received using the antenna ports 107/108 and the DMRS received using the antenna ports 109/101 may be used for channel estimation by the MTC device. This example may only be applied to the localized transmission scheme.

Second Approach

When the base station transmits the control channel (MTC-EPDCCH or M-PDCCH) for a MTC based on the DMRS using the PRB for PSS/SSS and/or PBCH transmission, the base station may not transmit the DMRS using the PRB. Rather, an RE resource that has been left empty without being used for transmitting the DMRS may additionally be used for transmission of the control channel (MTC-EPDCCH or M-PDCCH) for the MTC.

In this case, there is a problem that the MTC device cannot perform channel estimation in the corresponding subframe. However, when the coverage enhancement (CE) in which the control channel (MTC-EPDCCH or M-PDCCH) for MTC is repetitively transmitted on a plurality of subframes is configured, cross-subframe channel estimation may be used and thus channel estimation performance may not be affected.

The embodiments of the present invention as described above may be implemented using various means. For example, the embodiments of the invention may be implemented by hardware, firmware, software or a combination thereof. More specifically, descriptions thereof will be made with reference to the drawing.

Figure 19:
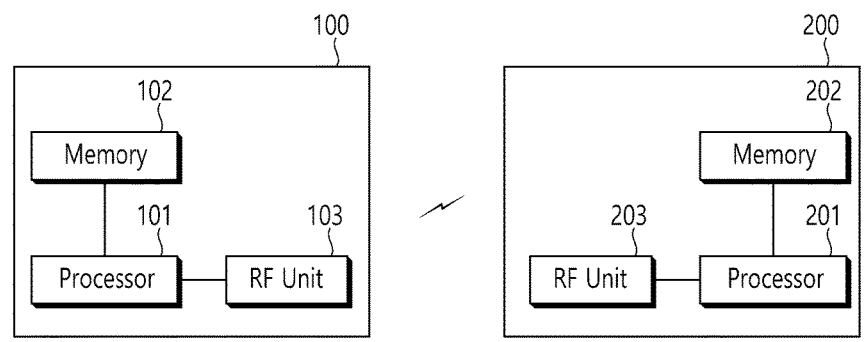
FIG. 19 is a block diagram illustrating a wireless communication system implementing embodiments of the present disclosure.

FIG. 19 is a block diagram illustrating a wireless communication system configured to implement the embodiments of the present disclosure.

The base station 200 includes a processor 201, a memory 202, and a radio frequency (RF) unit 203. The memory 202 is connected to the processor 201 and stores various information for driving the processor 201. The RF unit 203 is connected to the processor 201 to transmit and/or receive wireless signals. The processor 201 implements the proposed functions, processes and/or methods. In the above-described embodiments, the operation of the base station may be implemented by the processor 201.

The MTC device 100 includes a processor 101, a memory 102 and an RF unit 103. The memory 102 is connected to the processor 101 and stores various information for driving the processor 101. The RF unit 103 is connected to the processor 101 to transmit and/or receive wireless signals. The processor 101 implements the proposed functions, processes and/or methods.

The processor may include an application-specific integrated circuit (ASIC), other chipset, logic circuitry and/or data processing unit. The memory may include read-only memory (ROM), random access memory (RAM) and flash memory, memory cards, storage media, and/or other storage devices. The RF unit may include a baseband circuit for processing a radio signal. When the embodiments are implemented in software, the above-described techniques may be implemented using modules (processes, functions, etc.) that perform the functions described above. The modules may be stored in the memory and may be executed by the processor. The memory may be internal or external to the processor, and may be coupled to the processor by various well known means.

Although the method is described on the basis of a flowchart as a series of steps or blocks, the present invention is not limited to the order of the steps, and some steps may occur in different orders or simultaneously. It will also be appreciated by those skilled in the art that the steps shown in the flowchart are not exclusive and that other steps may be included or that one or more steps in the flowchart may be deleted without affecting the scope of the invention.

What is claimed is:

1. A method for receiving a physical downlink shared channel (PDSCH), the method performed by a user equipment (UE) and comprising:
   when the UE is not related to a low-complexity UE and when the UE is not configured for a coverage enhancement (CE) and when the PDSCH is to be received on a time division duplex (TDD)-based special subframe, calculating a number of physical resource blocks (PRBs) to be smaller than an actual total number of PRBs allocated for the PDSCH;
   when the UE is related to the low-complexity UE or the UE is configured for the CE, and when the PDSCH is not to be received on the TDD-based special subframe, calculating the number of PRBs to be the same as the actual total number of PRBs allocated for the PDSCH; and
   determining a transport block size in the PDSCH based on the calculated number of PRBs.

2. The method of claim 1, wherein when the UE is not related to does not correspond to the low-complexity UE and when the UE is not configured for the CE, a transport block size on a TDD-based downlink subframe is determined to be different from a transport block size on a TDD-based special subframe, regardless of whether an actual total number of PRBs on the TDD-based downlink subframe is the same as an actual total number of PRBs on the TDD-based special subframe.

3. The method of claim 1, wherein when the UE is related to the low-complexity UE or the UE is configured for the CE, and when the PDSCH is not to be received on the TDD-based special subframe, the transport block size is determined based on the calculated number of PRBs which is the same as the actual total number of PRBs allocated for the PDSCH.

4. The method of claim 1, further comprising:
   determining the actual total number of the PRBs allocated for the PDSCH.

5. The method of claim 1, further comprising:
   repeatedly receiving, on a plurality of subframes, downlink control channel including downlink control information (DCI) related to a scheduling of the PDSCH.

6. The method of claim 5, further comprising:
   when a resource element (RE) used for receiving the downlink control channel overlaps with an RE resource used for receiving a primary synchronization signal (PSS), a secondary synchronization signal (SSS), or a physical broadcast channel (PBCH), assuming that the downlink control channel is punctured on the RE resource or is rate-matched except for the RE resource.

7. The method of claim 5, wherein when a PRB to be monitored for receiving the downlink control channel overlaps with a PRB used for receiving a PSS, an SSS, or a PBCH, the PRB is not subjected to the monitoring.

8. The method of claim 1, further comprising:
   when the UE is related to the low-complexity UE or when the UE is configured for the CE, repeatedly receiving the PDSCH on a plurality of subframes.

9. A user equipment (UE) for receiving a physical downlink shared channel (PDSCH), the UE comprising:
   a transceiver; and
   a processor configured to control the transceiver, wherein the processor is configured to:
   when the UE is not related to a low-complexity UE and when the UE is not configured for a coverage enhancement (CE) and when the PDSCH is to be received on a time division duplex (TDD)-based special subframe, calculate a number of physical resource blocks (PRBs) to be smaller than an actual total number of PRBs allocated for the PDSCH;
   when the UE is related to the low-complexity UE or the UE is configured for the CE, and when the PDSCH is not to be received on the TDD-based special subframe, calculate the number of PRBs to be the same as the actual total number of PRBs allocated for the PDSCH; and
   determine a transport block size in the PDSCH based on the calculated number of PRBs.

10. The UE of claim 9, wherein the processor is further configured to:
    when the UE is related to the low-complexity UE or when the UE is configured for the CE, control the transceiver to repeatedly receive the PDSCH on a plurality of subframes.

11. The UE of claim 9, wherein when the UE is not related to the low-complexity UE and when the UE is not configured for the CE, a transport block size on a TDD-based downlink subframe is determined to be different from a transport block size on a TDD-based special subframe, regardless of whether an actual total number of PRBs on the TDD-based downlink subframe is the same as an actual total number of PRBs on the TDD-based special subframe.

12. The UE of claim 9, wherein when the UE is related to the low-complexity UE or the UE is configured for the CE, and when the PDSCH is not to be received on the TDD-based special subframe, the transport block size is determined based on the calculated number of PRBs which is the same as the actual total number of PRBs allocated for the PDSCH.

13. A method for receiving a physical downlink shared channel (PDSCH), the method performed by a user equipment (UE) and comprising:
    determining an actual total number of physical resource blocks (PRBs) allocated for the PDSCH;
    when the UE is not related to a low-complexity UE and when the UE is not configured for a coverage enhancement (CE), determining a transport block size on a time division duplex (TDD)-based downlink subframe to be different from a transport block size on a TDD-based special subframe, regardless of whether an actual total number of PRBs on the TDD-based downlink subframe is the same as an actual total number of PRBs on the TDD-based special subframe; and when the UE is related to the low-complexity UE or when the UE is configured for the CE, and when the PDSCH is not to be received on the TDD-based special subframe, determining a transport block size in the PDSCH based on the actual total number of PRBs.

14. The method of claim 13, further comprising:
when the UE is related to the low-complexity UE or when the UE is configured for the CE, repeatedly receiving the PDSCH on a plurality of subframes.

15. The method of claim 13, further comprising:
repeatedly receiving, on a plurality of subframes, downlink control channel including downlink control information (DCI) related to a scheduling of the PDSCH.

* * * * *